Aug. 22, 1961     H. A. AUSTIN ET AL     2,996,788
APPARATUS FOR ASSEMBLING A CENTRIFUGAL BLOWER WHEEL
Filed April 12, 1957

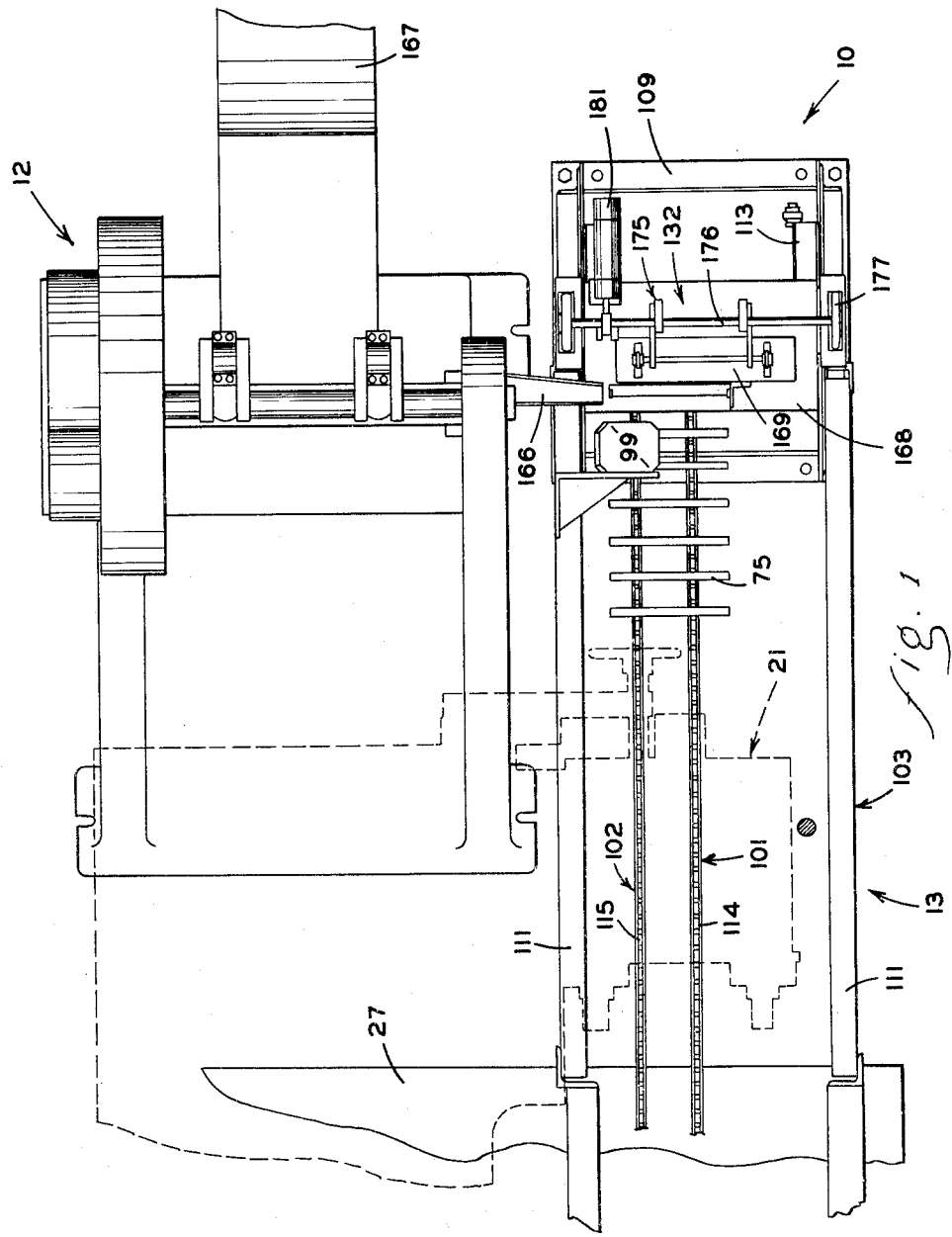

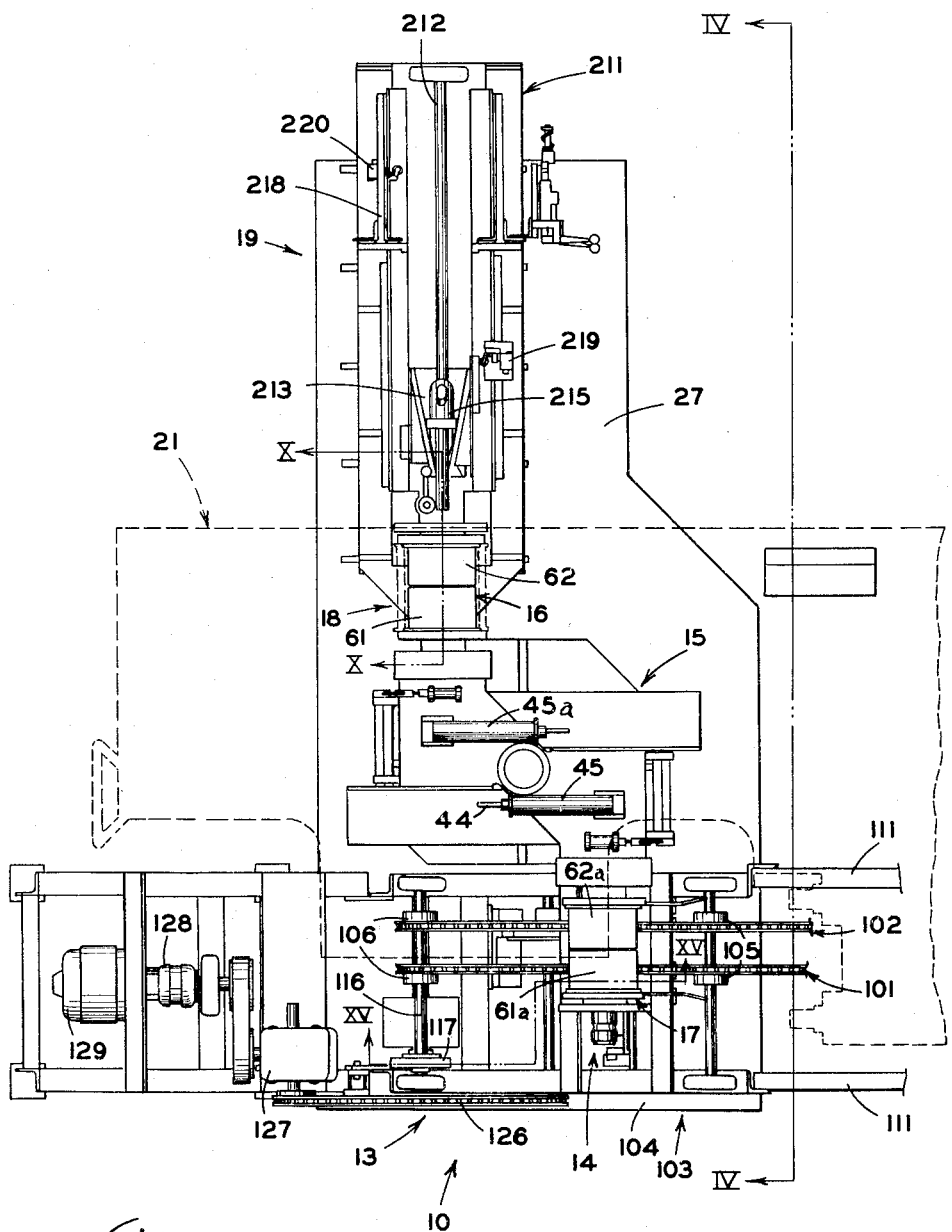

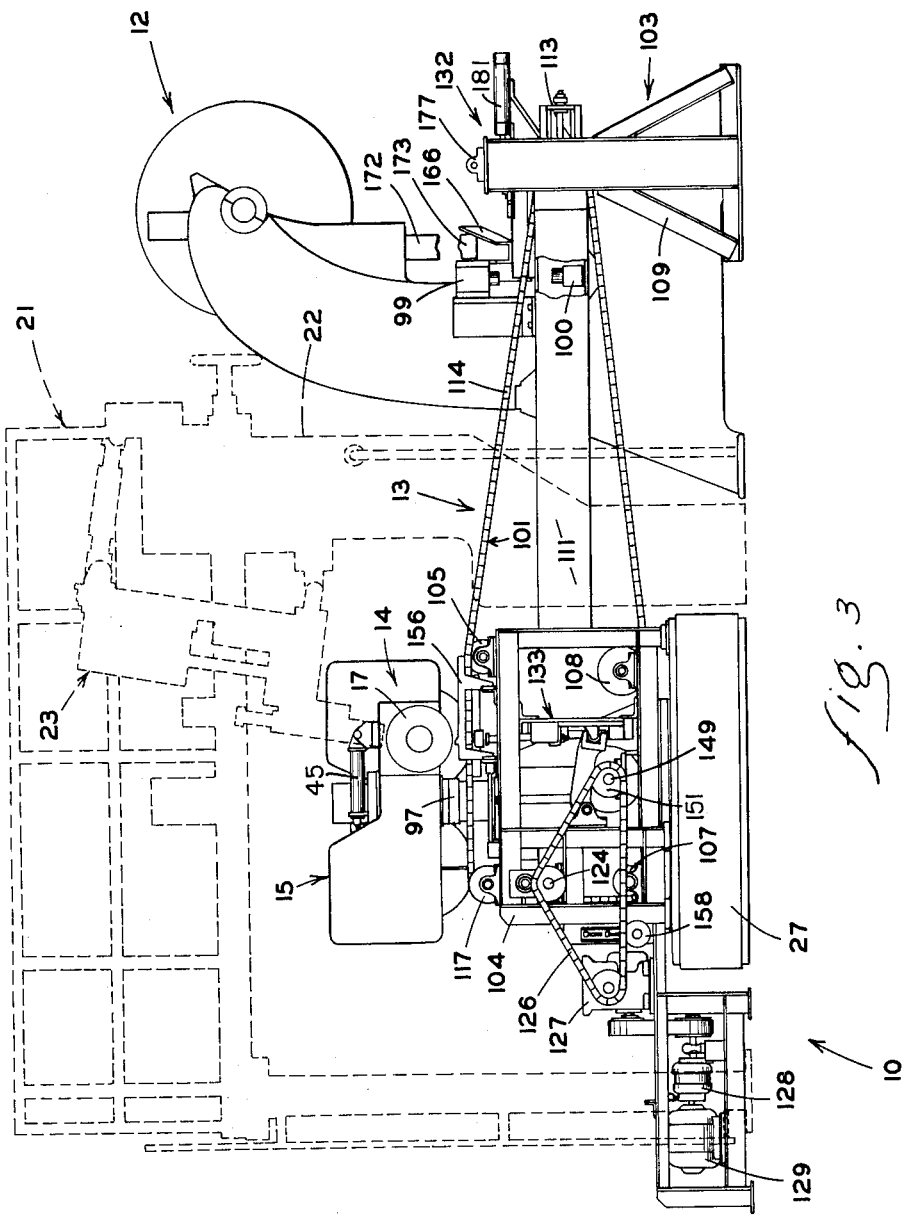

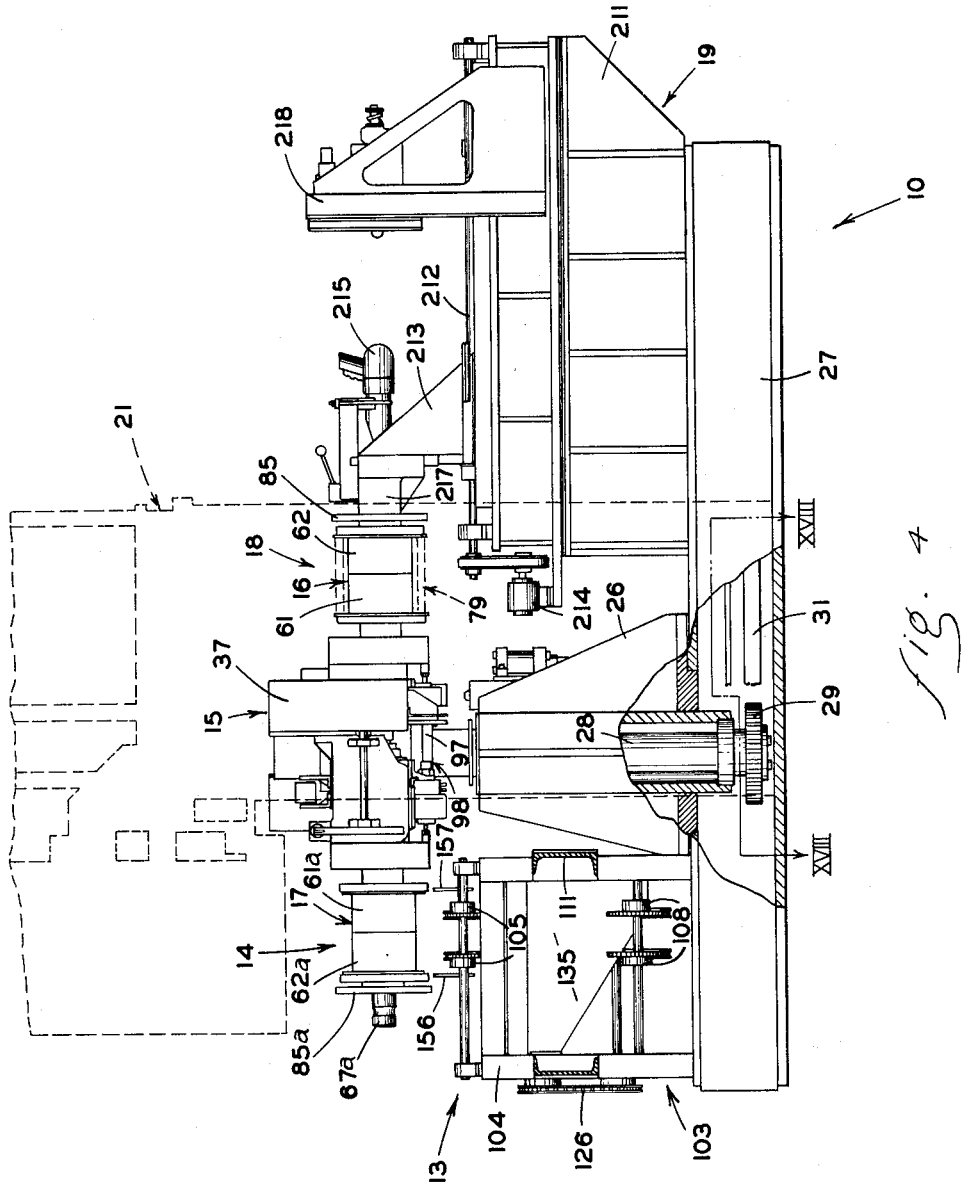

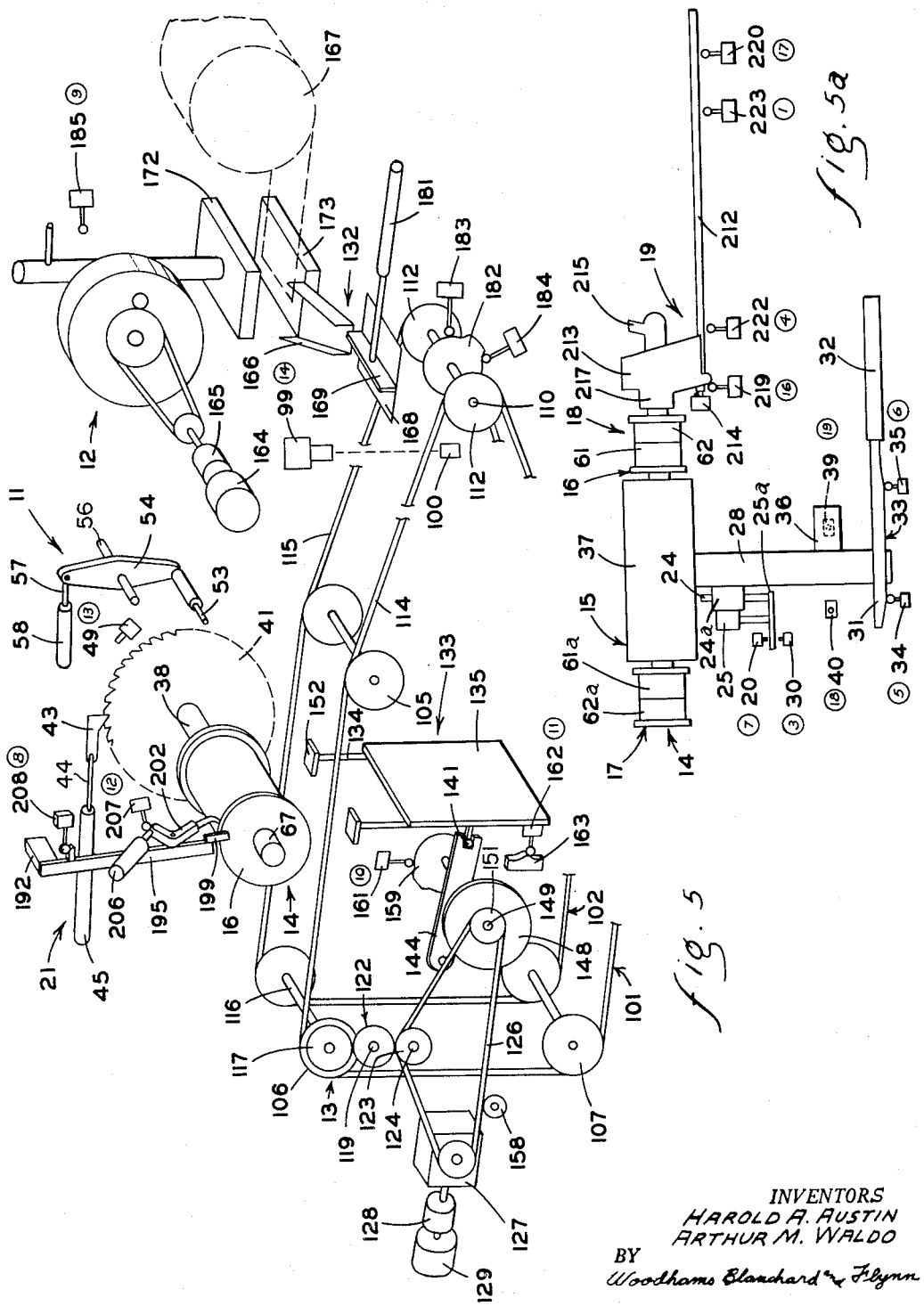

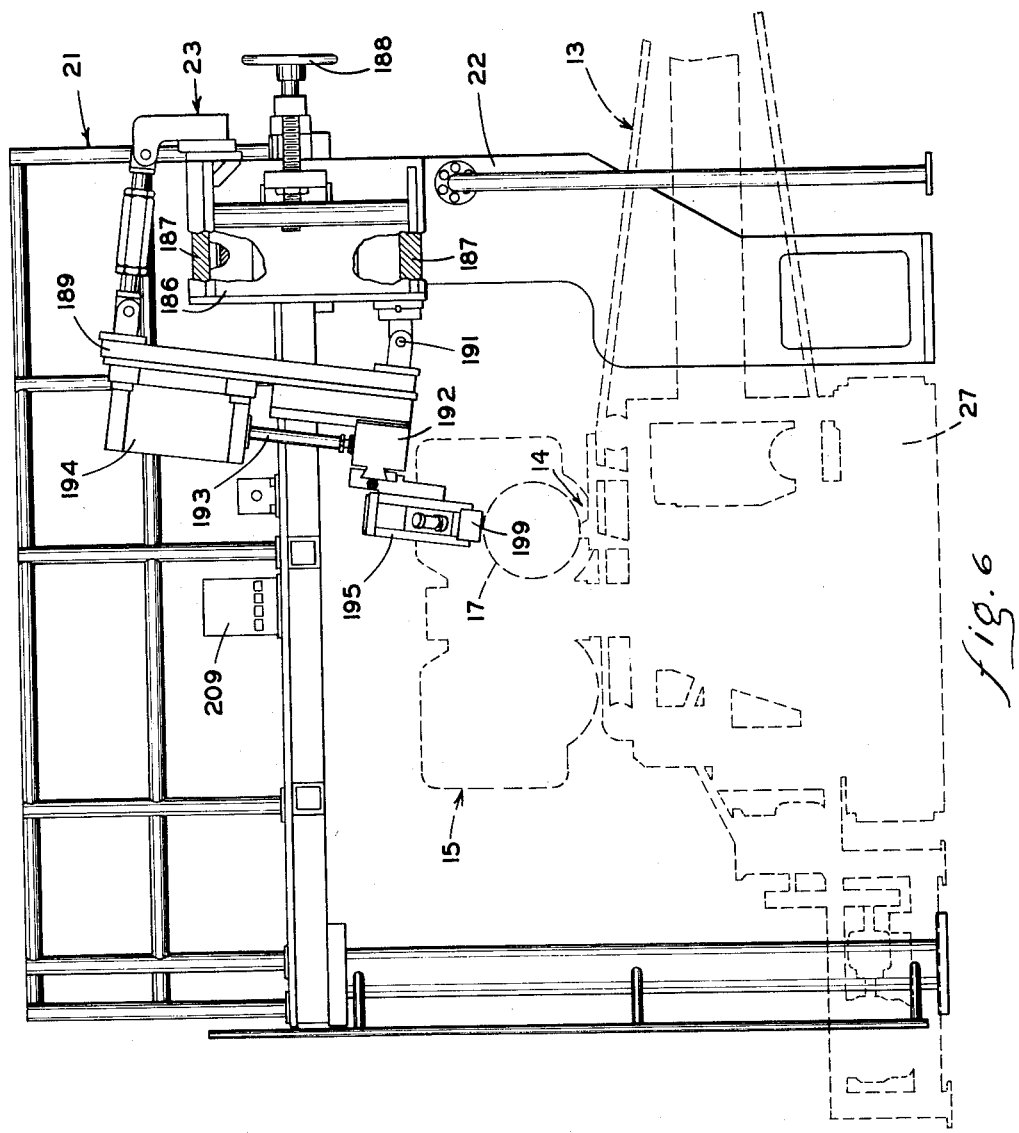

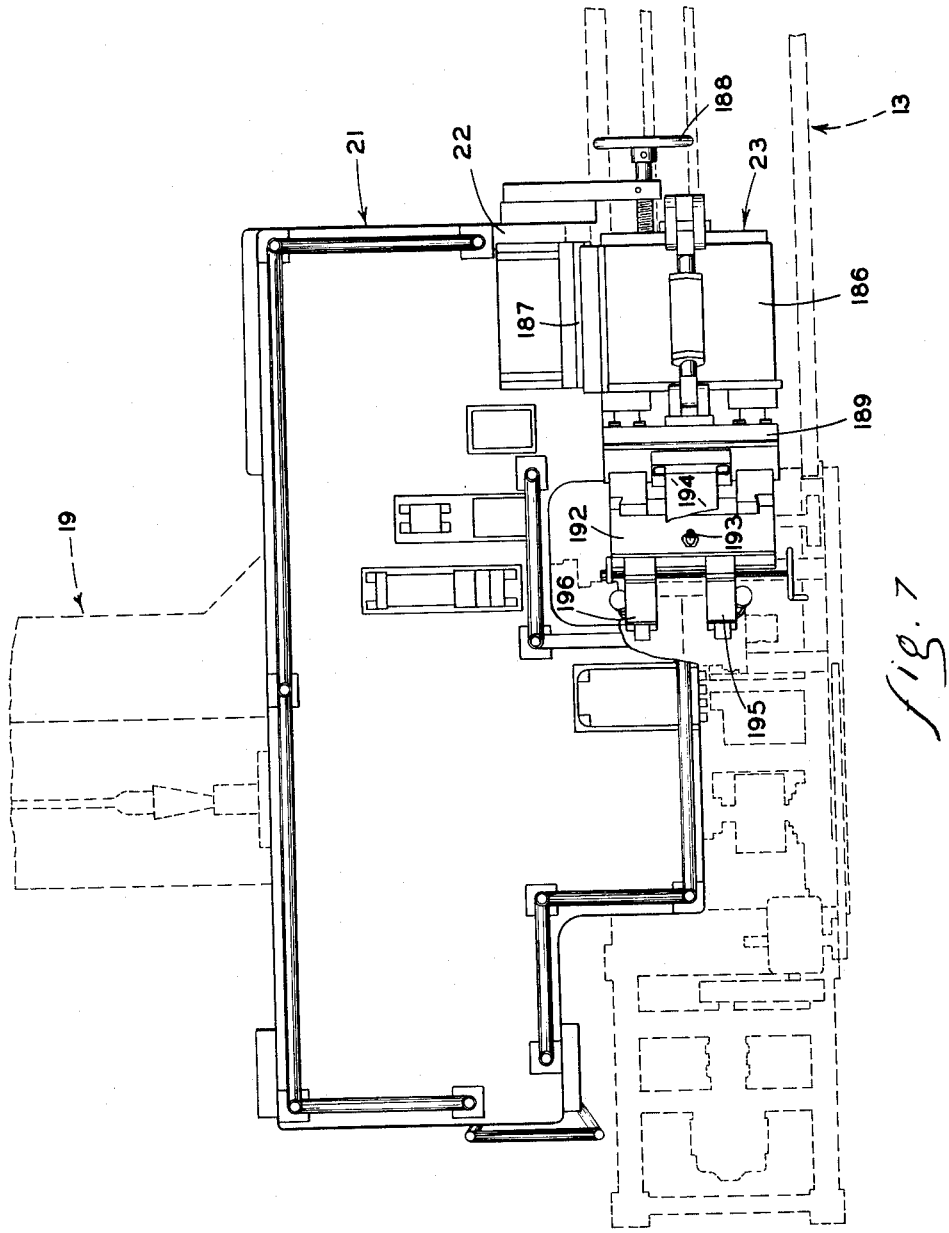

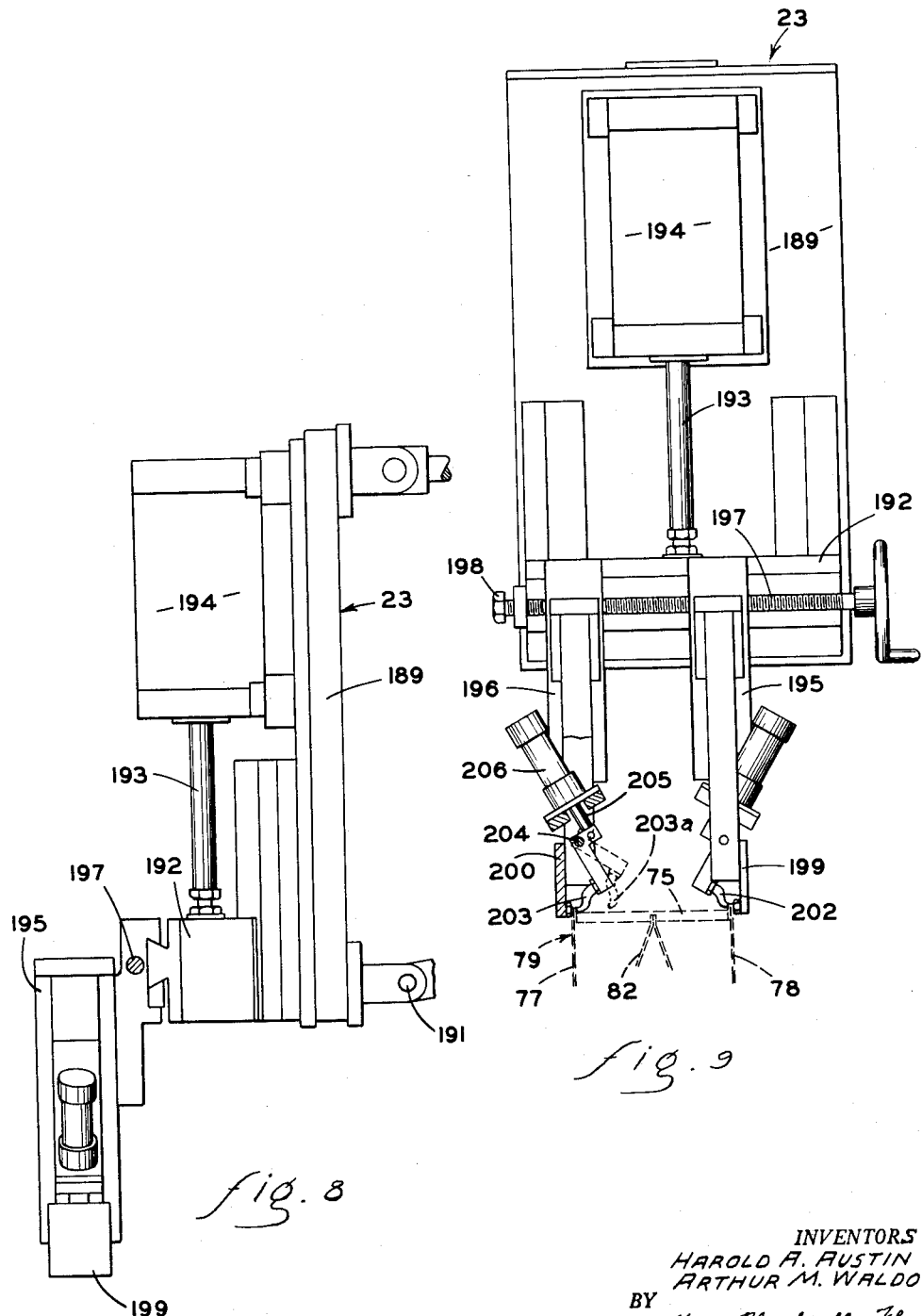

INVENTORS
HAROLD A. AUSTIN
ARTHUR M. WALDO
BY
Woodhams Blanchard & Flynn
ATTORNEYS

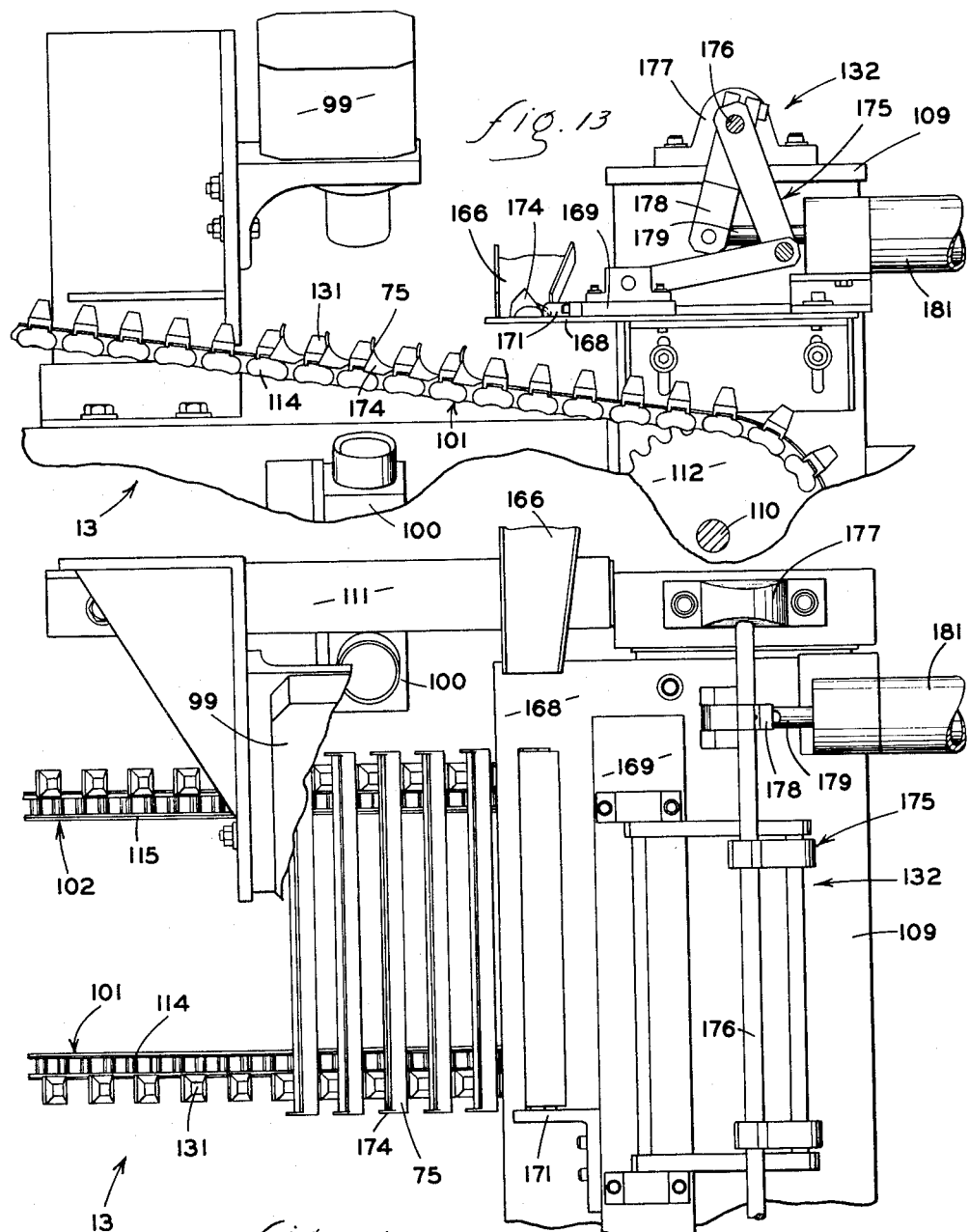

Aug. 22, 1961 H. A. AUSTIN ET AL 2,996,788
APPARATUS FOR ASSEMBLING A CENTRIFUGAL BLOWER WHEEL
Filed April 12, 1957 19 Sheets-Sheet 13

INVENTORS
HAROLD A. AUSTIN
ARTHUR M. WALDO
BY
Woodhams Blanchard & Flynn

ATTORNEYS

Aug. 22, 1961     H. A. AUSTIN ET AL     2,996,788
APPARATUS FOR ASSEMBLING A CENTRIFUGAL BLOWER WHEEL
Filed April 12, 1957     19 Sheets-Sheet 15

INVENTORS
HAROLD A. AUSTIN
ARTHUR M. WALDO
BY
Woodhams Blanchard & Flynn
ATTORNEYS

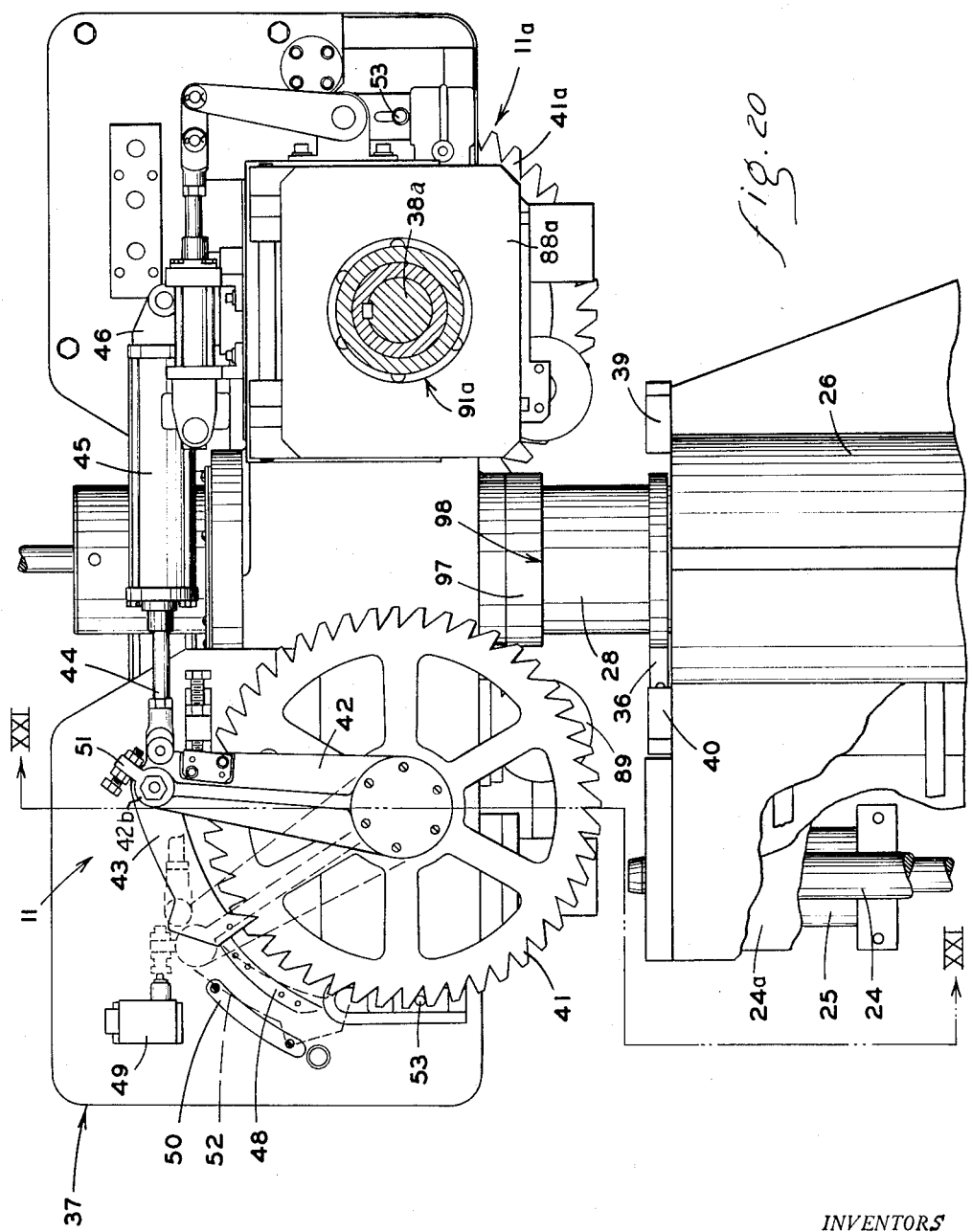

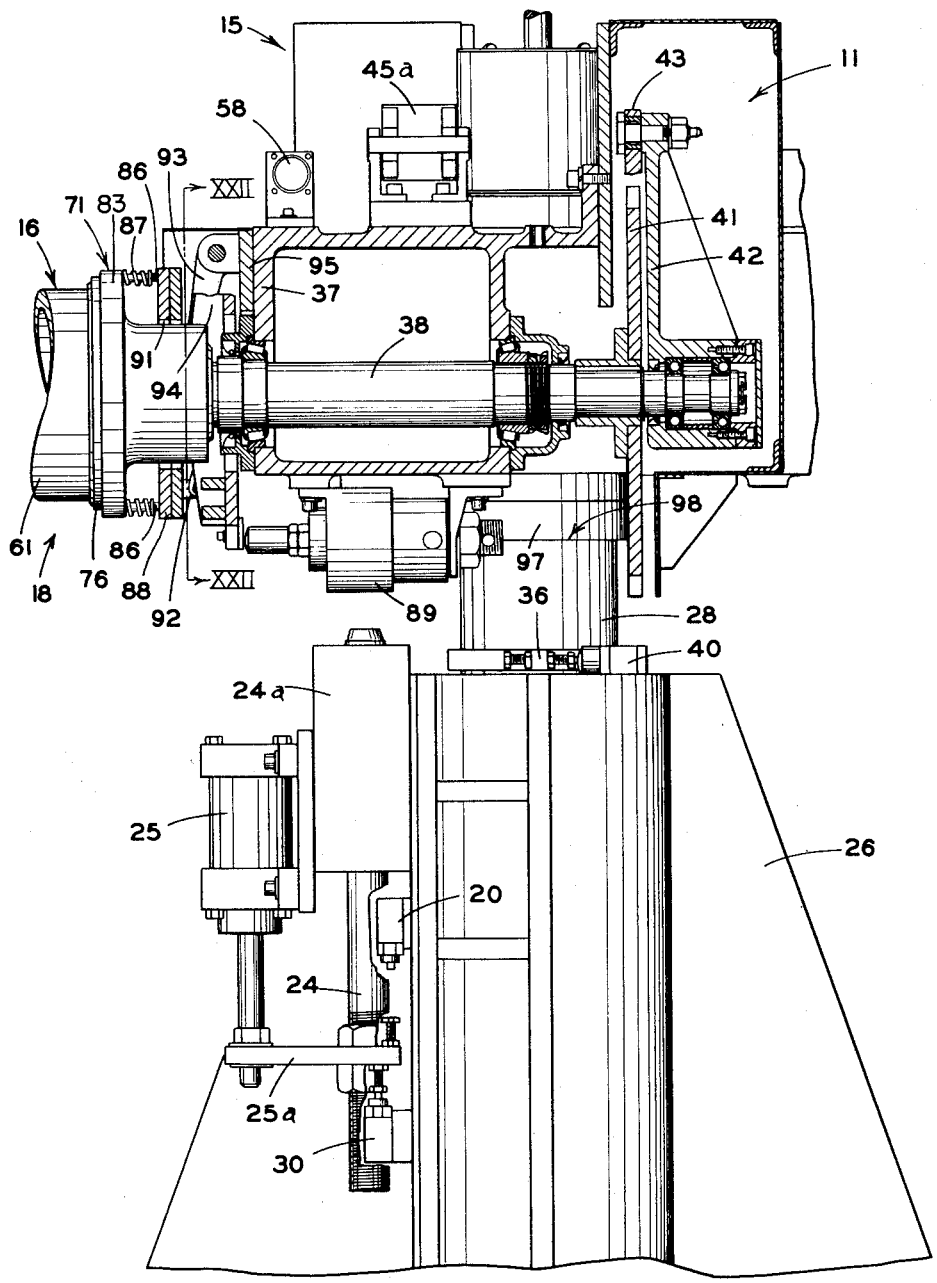

Aug. 22, 1961  H. A. AUSTIN ET AL  2,996,788
APPARATUS FOR ASSEMBLING A CENTRIFUGAL BLOWER WHEEL
Filed April 12, 1957  19 Sheets-Sheet 18

INVENTORS
HAROLD A. AUSTIN
ARTHUR M. WALDO
BY
Woodhams Blanchard & Flynn
ATTORNEYS

United States Patent Office 2,996,788
Patented Aug. 22, 1961

2,996,788
APPARATUS FOR ASSEMBLING A CENTRIFUGAL BLOWER WHEEL
Harold A. Austin, Kalamazoo, Mich., and Arthur M. Waldo, Toledo, Ohio, assignors to Brundage Company, Kalamazoo, Mich., a corporation of Michigan
Filed Apr. 12, 1957, Ser. No. 652,525
9 Claims. (Cl. 29—23.5)

This invention relates in general to a machine and method for assembling a centrifugal blower wheel having a pair of spaced, circular and co-axial end members secured to the opposite ends of a plurality of substantially identical and uniformly spaced blades. More particularly, this invention relates to a machine and method whereby said members are intermittently and uni-directionally rotated while said blades are moved into engagement with said members and then secured thereto, such moving and securing being effected entirely automatically.

It has been standard practice for many years to assemble centrifugal blower wheels, such as double furnace fan wheels, almost entirely by hand. Insofar as it is known, no machine has ever been provided whereby the blower blades are automatically moved from a source of supply of said blades into position between a pair of blower wheel end members, such as end rings or rims, and are then secured to the end members without any manual operation whatsoever being involved from the time the blades commence their movement toward the end members, until the wheel is completely fabricated.

All of the usual methods of manufacturing blower wheels require some means for securing the blades to the end members of the blower wheel, such as welding, riveting, spinning, or the like. However, before the blades can be secured, they must be properly positioned. Machines have been developed to secure the blades to the end members after the blades have been positioned, but some manual handling of the wheel has been required even in such cases, at least between the positioning of the blades and their securement to the end members.

Accordingly, a principal object of this invention has been the provision of a method of, and a completely automatic machine for, receiving and supporting a pair of circular end members for a blower wheel, moving the end members into an assembly position, causing said blades to be moved sequentially into a preselected attitude with respect to said end members as said end members are rotated uni-directionally and intermittently, and then securing said blades with respect to said end members, after which the completed wheel is moved away from said assembly position.

A further object of this invention has been the provision of a machine and method, as aforesaid, whereby said blower wheel may be fabricated more accurately, with greater uniformity, with less danger of injury to persons associated with the fabrication of said wheel, with less time required, and with greater ease than heretofore possible with any machines or methods presently or previously available.

A further object of this invention has been the provision of a machine, as aforesaid, having a stepwise applied, heat utilizing, securing operation, as welding or hot riveting, wherein the intermittent, uni-directional rotation of said end members above mentioned is sequenced so that said securing operation will avoid concentration of the heat in any one area of the said end members and will thereby minimize any tendency to warp them.

A further object of this invention has been the provision of a machine, as aforesaid, wherein the source of supply of said blades may be a punch press, the operation of which is integrated with the operation of the assembly machine.

A further object of this invention has been the provision of a machine, as aforesaid, wherein a mechanical device is provided for removing the fabricated blower wheel from the indexing head which moves said members into and out of assembling position after the assembling of the wheel, thereby reducing the manual operations required to an absolute minimum.

Other objects and purposes of this invention will become apparent to persons familiar with this type of equipment upon reading the following specification and examining the accompanying drawings, in which:

FIGURE 1 is a top plan view of a part of the assembling machine of the invention, including a punch press associated therewith and a welding head support shown in broken lines.

FIGURE 2 is a top plan view of the remainder of the assembling machine at the left of the portion thereof shown in FIGURE 1.

FIGURE 3 is a front elevational view of said machine, with the welding head and support therefor shown in broken lines.

FIGURE 4 is a sectional view taken along the line IV—IV of FIGURE 2 and including a broken line showing of said welding head and support therefor.

FIGURE 5 is a broken, diagrammatic and oblique view of said machine illustrating a majority of its essential elements as seen from in front of said machine.

FIGURE 5a is a diagrammatic view of that portion of said machine shown in FIGURE 4.

FIGURE 6 is a front elevation view of the welding head and support therefor, and includes a portion of the remainder of the machine in broken lines.

FIGURE 7 is a top plan view of said welding head and support, with a portion of the remainder of said machine in broken lines.

FIGURE 8 is an enlarged fragment of FIGURE 6, including said welding head.

FIGURE 9 is a side view of the welding head shown in FIGURE 8.

FIGURE 13 is an enlarged, broken fragment of the rightward end of said machine, as appearing in FIGURE 3.

FIGURE 14 is an enlarged, broken fragment of the rightward end of said machine, as appearing in FIGURE 1.

FIGURE 20 is a sectional view taken along the line XX—XX of FIGURE 19 with the guard covers removed therefrom.

FIGURE 21 is a sectional view taken along the line XXI—XXI of FIGURE 20.

GENERAL DESCRIPTION

Figure 10:
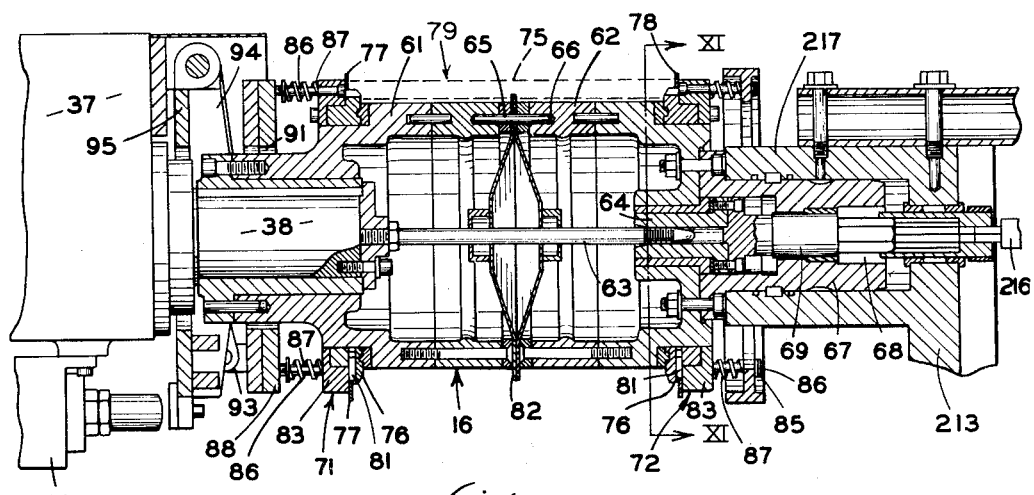
FIGURE 10 is a sectional view taken along the line X—X of FIGURE 2.

For the purpose of convenience in description, the terms "upper," "lower," "left," "right," "front," "rear," and derivatives thereof, as used herein, will have reference to the assembly machine and parts thereof as appearing in FIGURE 3. The terms "inner," "outer," and derivatives thereof, will have reference to the geometric center of said machine and parts thereof.

In order to meet the objects and purposes set forth above, as well as others related thereto, there has been provided (a) an assembly machine 10 (FIGURES 1, 2, 3, 4 and 5) comprising an indexing head 15 having index mechanism 11 for supporting and rotating the circular end members of a blower wheel 79, (b) a source of supply of blower blades, such as the press 12, and (c) conveyor mechanism 13 for moving said blades from the press 12 to an assembling position 14 adjacent to the indexing head 15. The indexing head 15 is rotatably supported for movement about a substantially vertical axis and includes a pair of fixtures 16 and 17, which are preferably identical and which are located on opposite sides of the rotational axis of said head. One of said fixtures, here the fixture 17, is in said assembling position 14 (FIGURE 2) when the other fixture 16 is in its loading and discharge position 18 adjacent to the fixture opening and closing mechanism 19. A welding apparatus 21 includes a support structure 22, upon which a welding head 23 is adjustably mounted, as shown in FIGURES 3, 6 and 7, so that said head may engage the fixtures 16 and 17 when they are in the assembling position 14. It will be understood, however, that the specific apparatus and structure described hereinafter for illustrative purposes is not intended to limit either the scope of the apparatus portion of the invention, nor is it intended to limit the practicing of the process to only the apparatus shown. Rather, with respect to both the apparatus and process portions of the invention, the specific apparatus shown is illustrative only and may be varied widely within the scope of the invention.

DETAILED CONSTRUCTION

Figure 18:
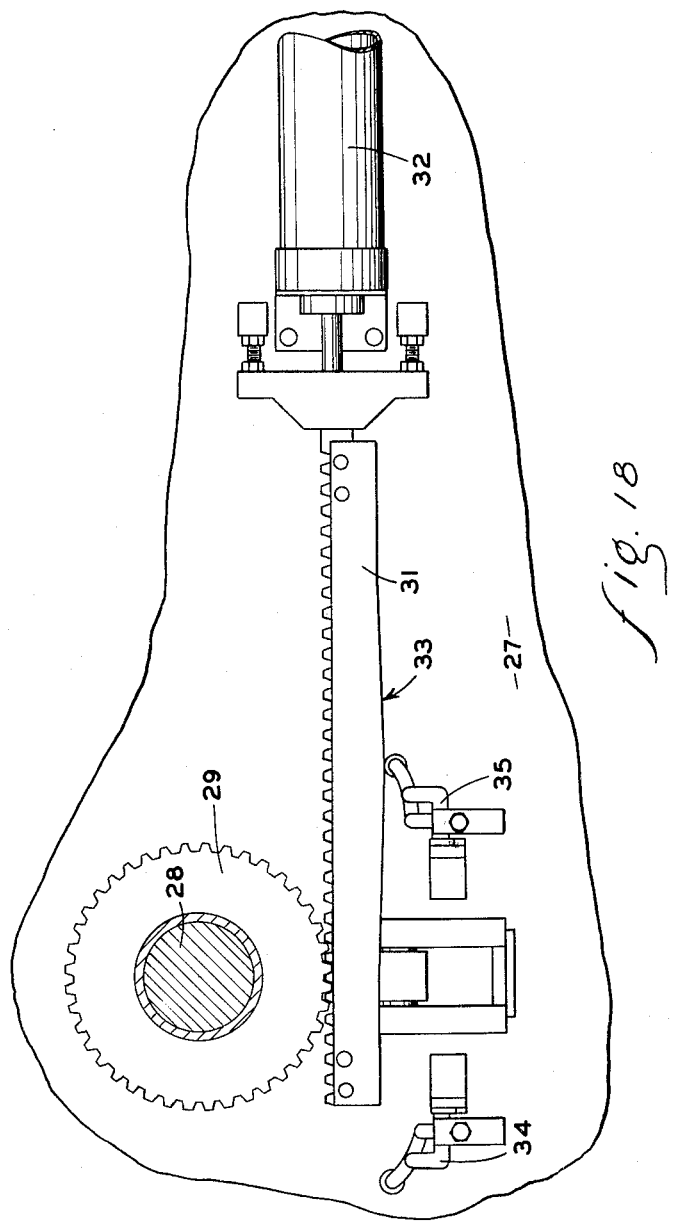
FIGURE 18 is a sectional view taken along the line XVIII—XVIII of FIGURE 4.
Figure 19:
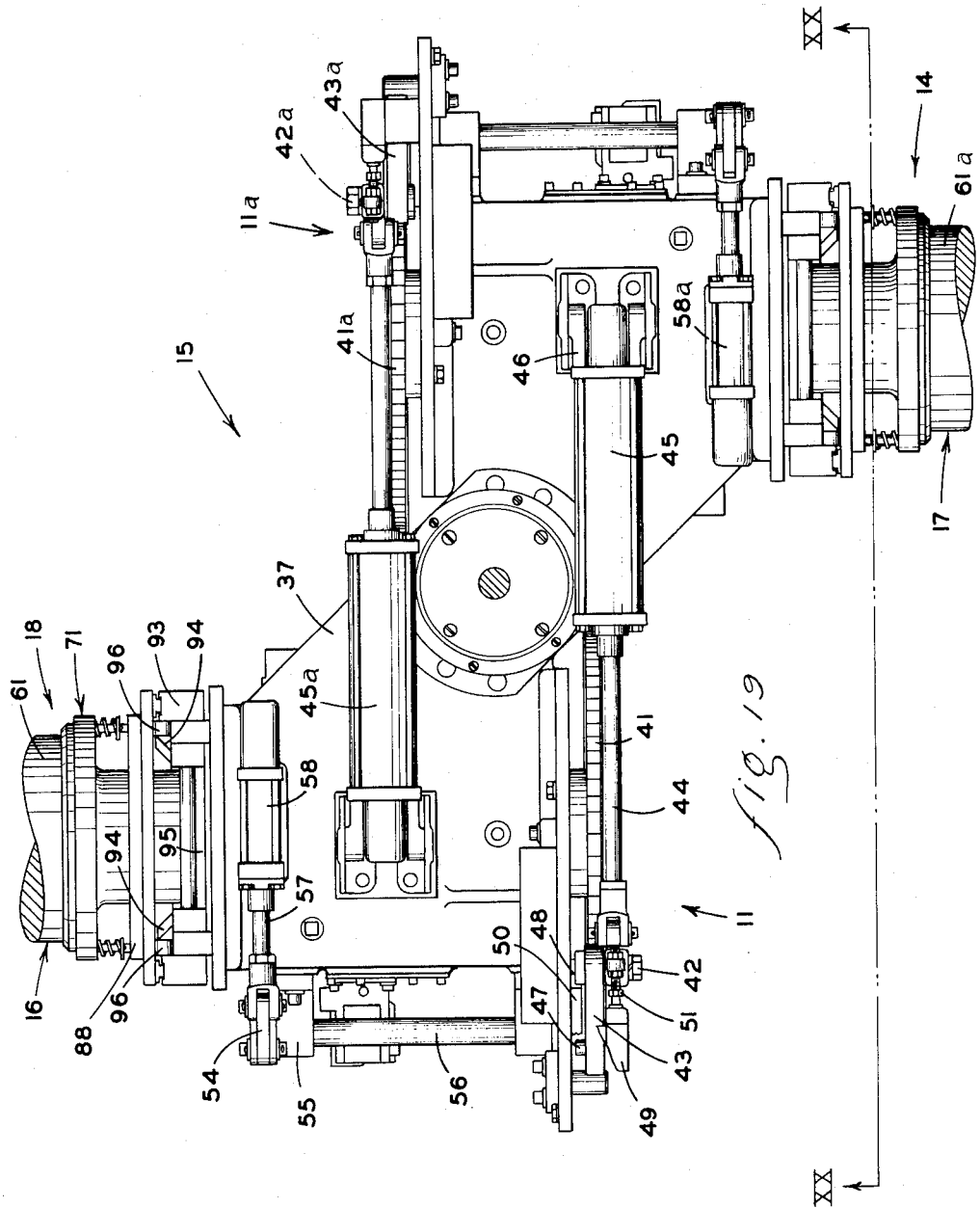
FIGURE 19 is an enlarged, top plan view of the indexing head shown in FIGURE 2, with parts of the fixtures attached to it.

As shown in FIGURES 2, 3, 4 and 19, the indexing head 15 of the machine 10 is supported by a pedestal 26 mounted upon a base frame 27 (FIGURE 4) between the leftward end of the conveyor mechanism 13 and the front end of the discharge mechanism 19. The indexing head 15 is mounted upon a vertical shaft 28, which is rotatably supported within the pedestal 26 and adjustable vertically with respect thereto. Adjustment means, not specifically disclosed, is provided for raising and lowering the indexing head 15 with respect to the supporting pedestal 26. In substance, such adjustment is effected by moving said indexing head upwardly or downwardly along the shaft 28 and then changing the thickness of the horseshoe shim 97 (FIGURE 20) which is disposed between the lower surface of the indexing head frame 37 and a shoulder 98 on said shaft 28. The lower end of the shaft 28 (FIGURES 4 and 18) supports a gear 29, which is engaged by a rack 31, which is horizontally reciprocable in a lengthwise direction by the piston of a drive cylinder 32. The cylinder 32 is connected to a source of fluid pressure, not shown, for effecting a 180° oscillation of the shaft 28 through the gear 29 and rack 31. The lengthwise edge of the rack 31 on the opposite side thereof from the gear 29 is provided with a cam 33 engageable with a pair of spaced, rack switches 34 and 35, which are arranged to control the stroke of the cylinder 32, hence the rotation of the shaft 28, in a substantially conventional manner, by controlling the flow of pressure fluid to the cylinder 32. Under normal operating conditions, full actuation of the cylinder 32 in either direction will effect a reversal in the positions of the fixtures 16 and 17, which are mounted upon the indexing head 15.

A detent pin 24 (FIGURES 5a, 20 and 21) is vertically reciprocably supported by means of the bracket 24a upon the pedestal 26 near the upper end thereof. Said pin 24 is connected by a bar 25a to the piston of a detent power cylinder 25 for vertical reciprocation in a substantially conventional manner, said power cylinder also being mounted upon the pedestal 26. Upper and lower detent switches 20 and 30, respectively, are provided on said pedestal 26 for operation by means on said connector bar 25a when in its upper and lower positions, respectively. The detent pin 24 is engageable with the indexing head frame 37 for holding same against rotation when said fixtures 16 and 17 are in said assembling and discharge positions, respectively, or vice versa. A limit arm 36 (FIGURES 5a and 20) extends radially from the drive shaft 28 just above the upper end of the pedestal 26 for engaging limit switches 39 and 40, located at opposite ends of the 180° rotary strokes of the head 15 effected by the rack 31.

(a) Indexing head

The indexing head 15 (FIGURES 2 and 19) supports the fixtures 16 and 17 on diametrically opposite sides of the shaft 28 and includes two sets of substantially identical index mechanisms 11 and 11a for effecting intermittent, uni-directional rotation of said fixtures in a manner discussed in detail hereinafter. Since the mechanisms 11 and 11a supporting and actuating the two said fixtures may be, and in this particular embodiment are, identical, specific detailed reference will be made only to mechanism 11 and the fixture 16 associated therewith, and such will be understood to apply to the mechanism 11a associated with said fixture 17. Where corresponding parts in the mechanism 11a or on fixture 17 must be specifically recited, similar numerals will be used with the suffix "a."

Said mechanism 11 (FIGURE 21) includes a substantially horizontal index shaft 38 which is rotatably supported by conventional bearings upon the indexing head frame 37 on one side of the drive shaft 28 (FIGURES 20 and 21). An index gear 41 is secured to, and rotatable with, said shaft 38 near the right end thereof. A pivot arm 42 is rotatably supported upon said one end of said shaft 38 and extends radially beyond the periphery of the index gear 41. One end of a pawl 43 is pivotally supported upon the outer end 42b (FIGURE 20) of the pivot arm 42, the other end of said pawl 43 being engageable with the teeth of said gear 41. The outer end 42b of the pivot arm 42 is also pivotally secured to the piston 44 of a pressure actuated, index cylinder 45 which is pivotally mounted by means of the bracket 46 upon the head frame 37. A pawl cam follower 47 (FIGURE 19) is mounted upon said pawl 43 near said other end thereof for engagement with a pawl cam 48 mounted upon the indexing head frame 37, adjacent to the periphery of the index gear 41. Interengagement of the pawl cam follower 47 with the lower edge of the pawl cam 48 effects positive engagement between the pawl 43 and the gear 41 in one direction of movement of said pawl and effects positive disengagement of said pawl 43 from the gear 41 in the reverse direction of movement of said pawl. In this particular embodiment, the positive engagement between said pawl and said index gear is effected during the extension of the piston 44 by the pressure cylinder 45, thereby effecting a relatively short, counterclockwise movement of the gear 41, as appearing in FIGURE 20, each time the pressure cylinder 45 is actuated.

An elongated stop member 50 (FIGURE 19) is mounted upon the head frame 37 just above, and substantially parallel with, the cam 48 for engaging the pawl cam follower 47 and thereby guiding the return movement of the pawl 43. A microswitch 49 is mounted upon said indexing head frame 37 near said pawl cam 48 for operation by a switch operator 51 mounted on said outer end 42b (FIGURE 20) of the pivot arm 42 each time the piston 44 of the pressure cylinder 45 reaches its substantially fully extended position, as shown at 52 in broken lines in FIGURE 20.

A brake pin 53 (FIGURES 5 and 20) is secured to one end of a rocker arm 54, which is pivotally supported upon the head frame 37 intermediate its ends by means of the rocker brackets 55 and the rocker shaft 56. The upper end of the rocker arm 54 is pivotally secured to the outer end of the piston 57 (FIGURES 5 and 19) of a braking cylinder 58, which cylinder is also secured upon the head frame 37. Actuation of the cylinder 58 effects movement of the brake pin 53 (FIGURE 20) into, and out of, a position between a pair of adjacent teeth on the periphery of the index gear 41. When in said position, said pin 53 prevents rotation of said gear 41. Thus, the return movement of the pawl 43 by the pivot arm 42 will not effect a rotation of the gear 41, hence of the shaft 38. The cylinder 58 (FIGURE 19) is actuated by a pressure fluid in a conventional manner to extend the piston 57 for the purpose of placing the brake pin 53 in braking position, in response to operation of the microswitch 49 by the switch operator 51. The braking action takes effect immediately upon termination of the counterclockwise movement of the pivot arm 42, as shown in broken lines at 52 in FIGURE 20.

(b) Wheel fixtures

The fixtures 16 and 17 (FIGURES 2, 10, 11 and 12) may vary in their specific construction rather widely according to the details of the wheel parts which they are intended to hold. However, specific embodiments disclosed and referred to herein will suffice to illustrate the portion of the invention comprised thereby, but it will be clearly understood that the use of these particular fixtures is for convenience in illustration and is not limiting.

The fixtures 16 and 17 herein illustrated are substantially identical in this particular embodiment of the invention and have the general outside appearance and contour of a spool. The fixture 16, which is illustrative of both fixtures, is divided approximately midway between its axial ends into a fixed end 61 and a movable end 62. The fixed end 61 of the fixture 16 is secured to, and rotatable with, that end of the index shaft 38 remote from the pivot arm 42. Said fixed end 61 is provided with a co-axial draw shaft 63, which extends co-axially almost completely through the movable end 62 of said fixture 16. The draw shaft 63 is threadedly engageable with a nut 64, which nut is rotatably supported within a co-axial chamber in the movable end 62 and held against axial movement toward the fixed end 61. Thus, when the nut 64 is tightened upon the draw shaft 63, the movable end 62 of the fixture 16 is held snugly against the fixed end 61.

Alignment pins 65 (FIGURE 10) and corresponding alignment openings 66, are provided in the fixed and movable ends, respectively, of the fixture 16, for accurately aligning the two ends during the engagement between the draw shaft 63 and the nut 64. The movable end 62 is provided with a co-axial hub 67, which extends away from the fixed end 61. Said hub 67 is provided with a co-axial bore 68, which communicates with the adjacent or outer end of the nut 64 and rotatably supports a nut operating shaft 69. The shaft 69 is connectible to, and operable by, means described hereinafter.

Figure 11:
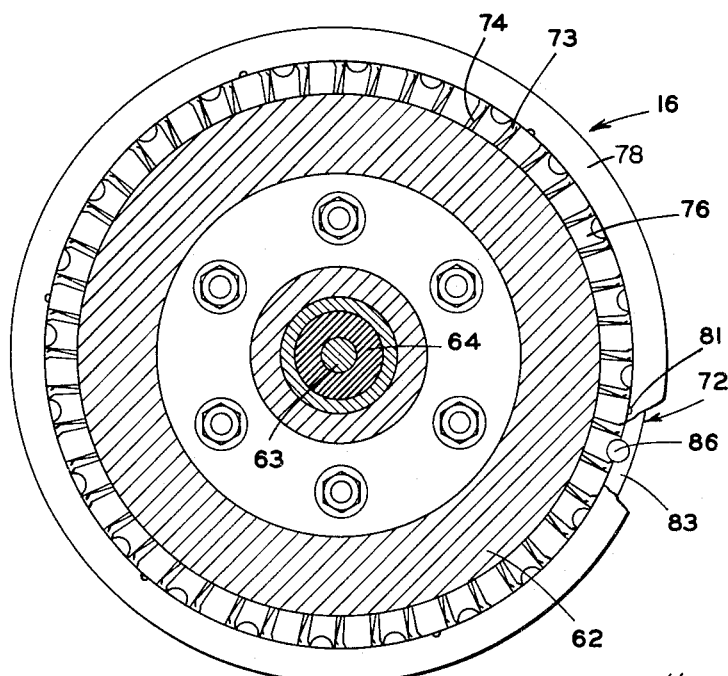
FIGURE 11 is a sectional view taken along the line XI—XI of FIGURE 10.
Figure 12:
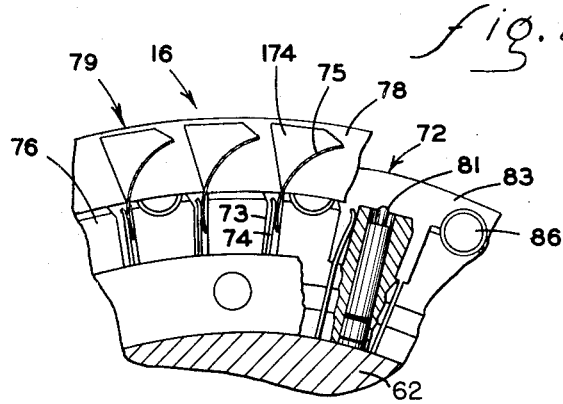
FIGURE 12 is an enlarged fragment of FIGURE 11.

The fixed and movable ends of the fixture 16 (FIGURE 10) are provided with annular flanges 71 and 72, respectively, which in this particular embodiment are equally spaced from their mutually adjacent ends. The flanges 71 and 72 each have portions 76 of reduced diameter on their opposing sides onto which the annular end members 77 and 78 of the blower wheel 79 are receivable. Spring-loaded detent pins 81 (FIGURE 12) are provided for removably holding said end members 77 and 78 against the large portions 83 of said flanges 71 and 72. As shown in FIGURES 11 and 12, the peripheries of said reduced portions 76 are provided with a plurality of radially disposed, uniformly spaced slots 73. Elongated springs 74 are secured to said flanges 71 and 72 so that they extend radially through the slots 73 for engaging the blades 75 near their opposite ends when said blades are disposed within the slots 73 in a manner discussed in detail hereinafter.

Where a center structure 82 is utilized in the blower wheel 79, it is disposed, as shown in FIGURE 10, between the two halves 61 and 62 of the fixture with the draw shaft 63 extending through the shaft opening in said structure 82. A stripper ring 85 is disposed coaxial with, and adjacent to the outer surface of, the flange 72. Said stripper ring 85 supports a plurality of parallel stripper rods 86, which are arranged in a circle and extend through suitable openings in the flange 72. Said rods 86 are engageable with the outer side of the end members 77 and 78 for urging said members over the detent pins 81 and away from the respective flanges 71 and 72. Springs 87, which encircle the stripper rods 86, tend to prevent the rods 86 from extending inwardly beyond said large portion 83. As shown in FIGURES 10 and 21, stripper rods 86 extend through the flange 71 in the same manner as set forth with respect to the flange 72. However, a stripper plate 88, which is mounted on the indexing head frame 37 for movement toward and away from the outer surface of the flange 71, is provided for engaging the stripper rods 86 and moving them into engagement with the adjacent surface of the end member 77 (FIGURE 10) while compressing the stripper springs 87.

The stripper plate 88 (FIGURES 10 and 21) has a central opening 91 through which the index shaft 38 extends for engagement with the fixed half 61 of the fixture 16. Said stripper plate 88 is pivotally engaged by four pivot links 92 and 93, the other ends of which are pivotally mounted in the same pattern upon the indexing head frame 37 at intervals around said index shaft 38. Said links 92 and 93, said stripper plate 88 and said indexing head frame 37 are so arranged and interconnected that two parallelograms are formed thereby on opposite sides of the shaft 38.

Figure 22:
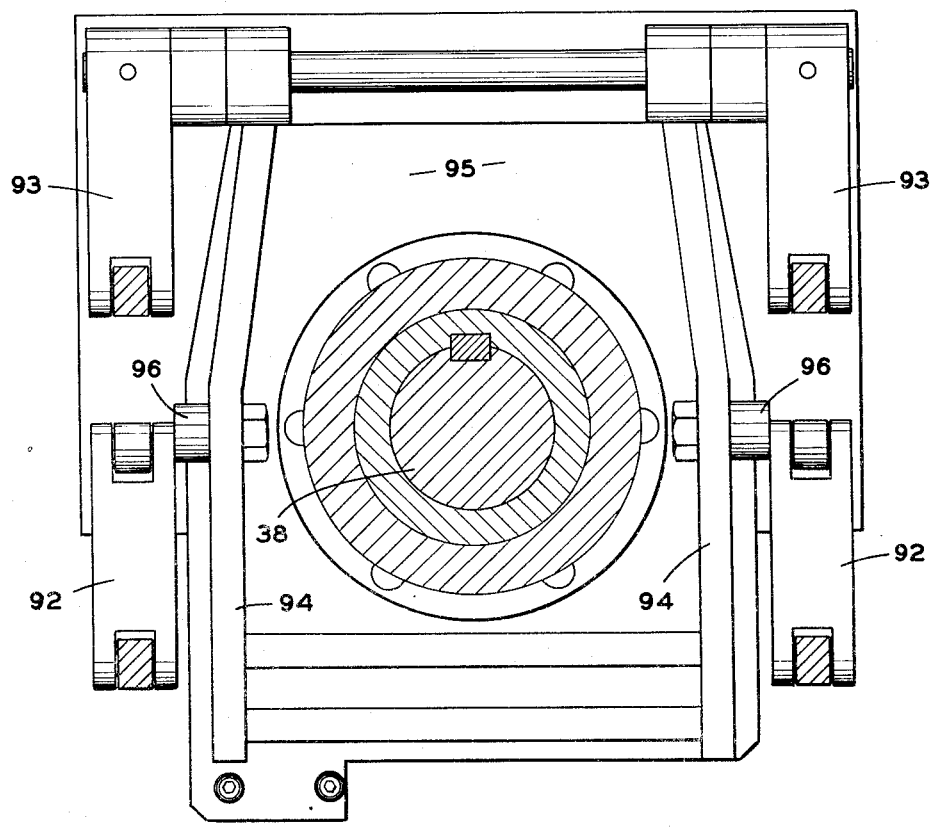
FIGURE 22 is a sectional view taken along the line XXII—XXII of FIGURE 21.

A pair of lever arms 94 (FIGURES 10, 21 and 22) are pivotally mounted upon the indexing head frame 37 adjacent to the two upper links 93, respectively, and depend therefrom. Said arms are interengaged by a connecting plate 95 which encircles the shaft 38 and is engaged by the piston rod of a pressure cylinder 89 mounted on the head frame 37. A pair of rollers 96 are mounted upon the lever arms 94, respectively, for engagement with the adjacent surface of the stripper plate 88. Thus, when said lever arms are pivoted toward the fixture 16 and the stripper plate 88 by the pressure cylinder 89, said rollers 96 will engage the adjacent surface of the stripper plate 88, thereby urging it against the stripper rods 86. The springs 87 are compressed and the stripping rods 86 extend through the flange 71 to engage the end member 77.

A more complete and detailed description of the fixtures 16 and 17 is provided in the co-pending application Serial No. 652,493 entitled "Fixture for Assembling Blower Wheel," and filed concurrently herewith and issued as Patent No. 2,914,316.

The fixture 17 (FIGURES 2, 4 and 19), like the fixture 16, has a fixed half 61a and a movable half 62a, said fixed half being mounted on one end of an index shaft 38a, which is part of the indexing mechanism 11a. Said shaft 38a (FIGURE 20) is mounted within the indexing head frame 37, parallel with the index shaft 38 and on the opposite side of the head shaft 28. An index gear 41a is mounted upon said shaft 38a for engagement by the pawl 43a mounted upon the pivot arm 42a in substantially the same manner as set forth in detail hereinabove with respect to the corresponding parts associated with the fixture 16. A pressure cylinder 45a is provided for moving the pivot arm 42a, and a brake pin 53a, operable by a pressure cylinder 58a, is provided for holding the gear 41a against reverse movement and thereby insuring unidirectional movement of the shaft 38a. As stated previously, one of the two fixtures 16 and 17 is normally in the assembling position 14 (FIGURE 4) while the other of said two fixtures is in the loading or discharge position 18.

(c) Conveyor mechanism

As shown in FIGURES 2, 3 and 4, said assembling position 14 is located immediately above the leftward or discharge end of the conveyor mechanism 13. Hence, the axis of rotation of the fixture, here fixture 17, disposed in the assembling position 14 is transverse of said conveyor mechanism which, in this embodiment, is comprised principally of a pair of substantially parallel, endless conveyor chains 101 and 102 (FIGURE 2). A conveyor support structure 103 has a left frame 104, which is rigidly secured upon the base frame 27 adjacent to the pedestal 26 and beneath the assembling position 14 (FIGURE 3). The two chains 101 and 102 are preferably supported upon the left frame 104 by four pairs of sprockets 105, 106, 107 and 108, which sprockets are rotatably supported upon said left frame 104.

The conveyor support structure 103 also has a right frame 109 (FIGURES 1 and 3), which is braced with respect to the left frame 104 by the parallel beams 111. The conveyor chains 101 and 102 are movably supported upon the right frame 109 by a pair of sprockets 112 (FIGURES 5 and 13) mounted on the shaft 110. The tension on the conveyor chains 101 and 102 may be adjusted in a substantially conventional manner, as by the tensioning mechanism 113 (FIGURES 1 and 3) associated with the means supporting the sprockets 112 upon the right frame 109. The conveyor chains 101 and 102 have parallel, upper courses 114 and 115, which move from the right frame 109 toward the left frame 104 and are supported upon the sprockets 112, 105 and 106.

The sprockets 106 (FIGURES 15 and 16) are supported upon a shaft 116, which mounts a gear 117 for rotation therewith. Said gear 117 is engaged by a pinion 118 which is mounted upon, and rotatable with, a driven shaft 119. The driven shaft 119, which also mounts the driven member 121 of a Geneva wheel assembly 122 is rotatably mounted upon the frame 104 in a conventional manner. A driver 123 of said assembly 122 is mounted upon a drive shaft 124 (FIGURES 15 and 16), which is rotatably supported upon the left frame 104 by means of the bearings 125. The drive shaft 124 is engaged, and driven, by a chain 126 (FIGURE 3), which chain is connected to a gear box 127. The gear box 127 is, in turn, connected through an electrically operated clutch 128 to a prime mover, such as the motor 129.

Each of said chains 101 and 102 is provided with a plurality of uniformly spaced lugs 131 (FIGURES 1, 15 and 16) which extend upwardly from the upper courses 114 and 115 of said chains. The blades 75 are deposited between adjacent lugs on each of said chains in a predetermined attitude by a suitable blade feeding or loading device, such as the blade feeding device 132 disposed on the right frame 109 (FIGURES 13 and 14), which will be discussed in detail hereinafter.

(d) Blade supply

A source of supply of blades 75 is provided adjacent to the rightward end of the conveyor mechanism 13 (FIGURES 1 and 3). Said source may be a punch press 12, as disclosed herein, or a magazine 231 (FIGURES 23 and 24) containing a plurality of previously formed blades 75 (FIGURES 5, 13 and 14). If a press is used, a blade chute 166 is provided with said press and suitable blade ejection means, not shown, of any convenient, conventional type, is provided for ejecting the finished blades from the press 12 into said chute 166. The press 12 is driven through a clutch 165 by means such as a motor 164. The blades 75 are formed from an elongated strip of flat material provided in a roll 167 (FIGURE 1), adjacent to said press 12, also in a conventional manner.

Any one of several mechanisms, such as the blade feeding device 132, may be provided for directing the blades 75 onto the conveyor. Thus, although the device 132 is specifically described, it will be understood that other means, such as a gravity fed continuation of the chute 166, could be used with appropriate gate means, not shown, to direct said blades onto said conveyor.

The blades 75 are, in the described embodiment, deposited by the chute 166 upon a substantially horizontal blade table 168, which is part of the blade feeding device 132 and which is located on top of the right frame 109 above the conveyor upper courses 114 and 115. A loading bar 169 is slidably disposed upon the table 168 for movement lengthwise of the conveyor chains (FIGURES 13 and 14). The loading bar 169 is provided with a blade stop 171, which the leading end of the blade 75 engages as it moves onto said table 168 from the chute 166. The blades 75 are of the forwardly curved type, in this particular embodiment, and the press dies 172 and 173 (FIGURE 3) are so arranged that the finished blades will be deposited by the chute 166 upon the table 168 with their concave sides facing downwardly for reasons appearing hereinafter. The blades 75 are provided with ears 174 at the opposite ends thereof, which extend away from the convex sides of said blades substantially perpendicularly to the lengthwise extent thereof. Thus, when the blades 75 are disposed upon the blade table 168, the ears 174 extend upwardly therefrom, as appearing in FIGURE 13.

The blade loading bar 169 is secured by linkage 175 (FIGURES 13 and 14) to a pivot shaft 176 mounted upon the upper end of the right frame 109, by means of the bearings 177. A crank 178 is secured to, and between, the pivot shaft 176 and the piston 179 of a power cylinder 181 supported upon said right frame 109. Thus, operation of the cylinder 181 effects a leftward and rightward reciprocation of the blade loading bar 169, as appearing in FIGURES 13 and 14. Such reciprocation of the loading bar 169 will cause a blade 75 disposed on the table 168 to be removed therefrom and deposited upon the upper courses of the conveyor mechanism 13 in the position shown in FIGURES 13 and 14, that is, with the concave side of said blade facing upwardly and rightwardly and the ears 174 extending downwardly and leftwardly. With the blades 75 in this position, between adjacent lugs 131 on said courses 114 and 115, said blades are arranged in the proper attitude for insertion into, and engagement by, the fixtures 16 and 17 in a manner discussed hereinabove.

The operation of the power cylinder 181, hence of the loading bar 169, is synchronized with the movement of the conveyor mechanism 13. The press 12 is also synchronized with the conveyor mechanism 13 by means of the synchronizing cam 182, which is mounted upon and rotatable with, the sprocket shaft 110. Said cam 182 is engaged by a pair of switches 183 and 184, which are connected to the clutch 165 for effecting the synchronization. A counting switch 185 (FIGURE 5) is operable by the upper, movable die 172 of the press 12 with each reciprocation thereof for stopping the operation of said press when the proper number of blades for a particular blower wheel are completed. A photoelectric cell 99 and a cooperating light source 100 are mounted upon the right frame 109, above and below, respectively, the upper courses 114 and 115 for detecting the lack of a blade upon the conveyor mechanism 13 and for giving suitable notice thereof.

(e) Blade transfer mechanism

Figure 17:
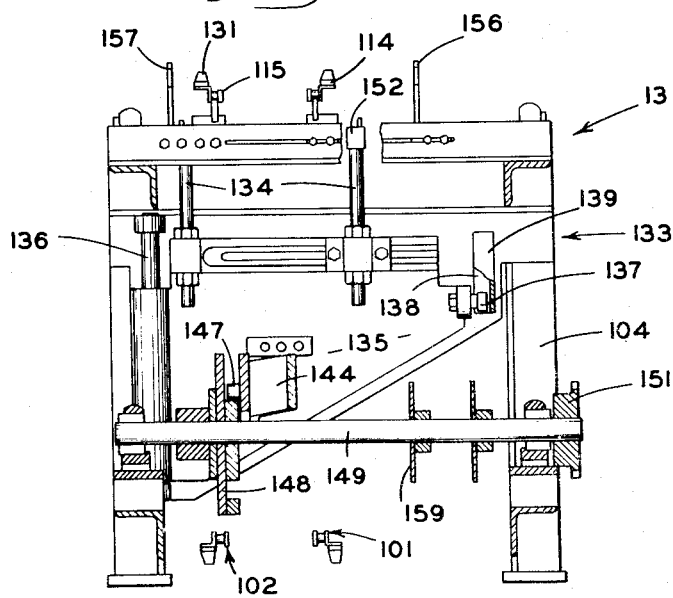
FIGURE 17 is a sectional view taken along the line XVII—XVII of FIGURE 15.

A transfer mechanism or elevator 133, which is mounted upon the left frame 104, is provided for engaging said blades, one at a time, and transferring them from the conveyor chains 101 and 102 to whichever fixture, 16 or 17, is in the assembling position 14 as said blades 75 are moved by the chains 101 and 102 from the table 168 to a point beneath the assembling position 14. The transfer mechanism 133 includes a plurality, here two, of substantially vertical lift posts 134, which are adjustably supported upon a lift plate 135 (FIGURE 17). The lift plate 135 is vertically, slidably supported adjacent to the rear edge thereof upon a substantially vertical slide rod 136, which rod is rigidly secured to the left frame 104 of the conveyor structure 103. The front edge of said lift plate 135 rotatably supports a roller 137, rotatable about a substantially horizontal axis parallel with said plate and disposed within a vertical slot 138 in the guide bar 139, which is also rigidly mounted upon the left frame 104. Thus, the slide rod 136 and guide bar 139 restrict movement of the lift plate 135, hence the lift posts 134, to vertically reciprocable movement substantially within a single plane.

Figure 15:
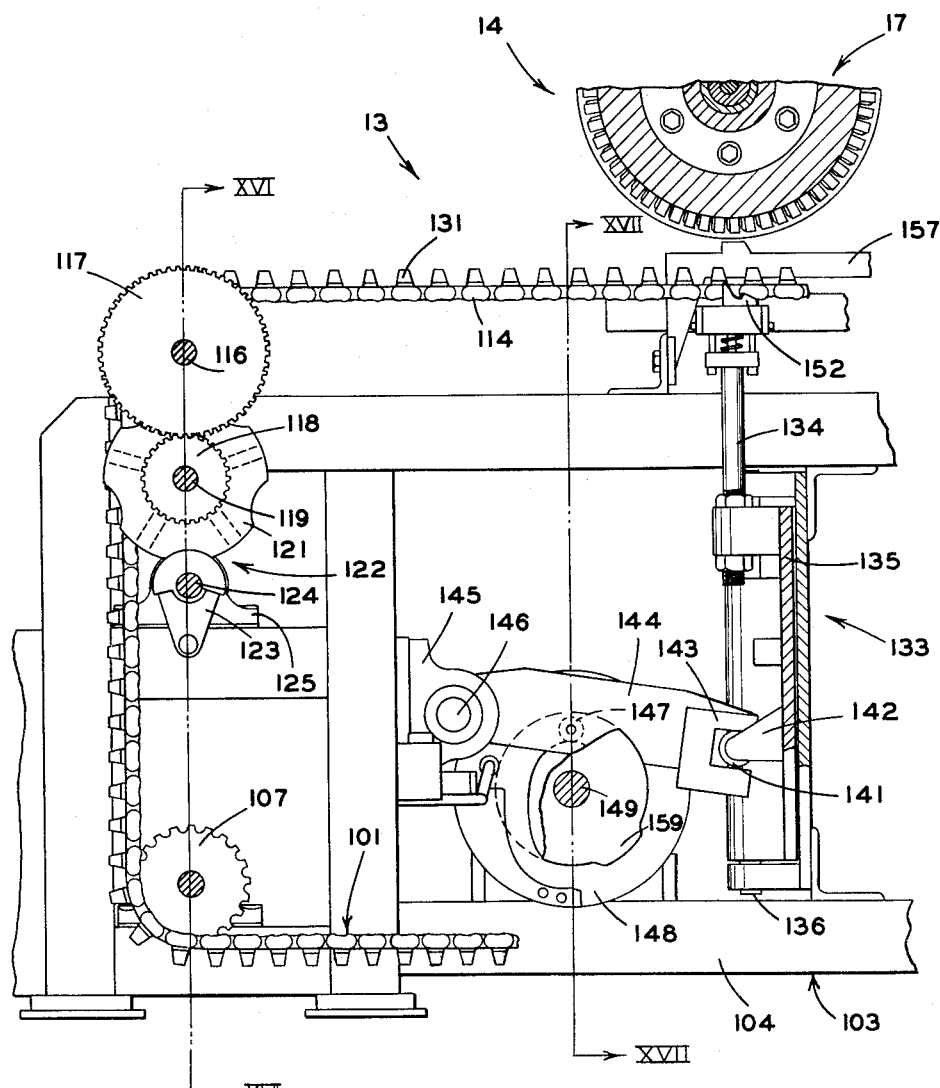
FIGURE 15 is a sectional view, substantially as taken along the line XV—XV of FIGURE 2.
Figure 16:
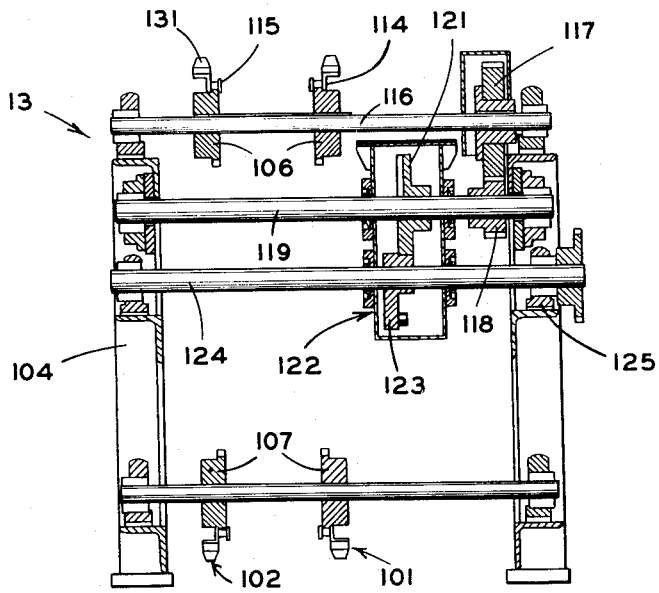
FIGURE 16 is a sectional view taken along the line XVI—XVI of FIGURE 15.

A pivot roller 141 is rotatably supported upon the leftward side of the lift plate 135 (FIGURE 15) by means of brackets 142, with its axis substantially parallel with the axis of the guide roller 137. The pivot roller 141 is disposed within the bifurcated end 143 of the actuating lever 144, whose other end is pivotally supported by means of the bearings 145 and shaft 146 upon the left frame 104. A cam roller 147, having an axis substantially parallel with the axis of the pivot shaft 146, is rotatably supported upon the actuating lever 144 between the ends thereof. Said cam roller 147 is engageable with a cam 148 mounted upon, and rotatable with, the cam shaft 149 (FIGURE 15). Rotation of cam 148 effects vertical reciprocation of the roller 147, hence of the right end of the lever 144. A sprocket 151 (FIGURE 17), supported upon, and secured to, the cam shaft 149, is engaged by the drive chain 126 (FIGURE 3) which is driven, as described hereinabove, by the motor 129. Thus, rotation of the cam shaft 149, which is coincidental with the rotation of the drive shaft 124 for operating the conveyor mechanism 13, effects a vertical reciprocation of the lift plate 135, hence the lift posts 134.

Each lift post 134 (FIGURES 15 and 17) is provided with a blade injector 152, which is resiliently supported upon the upper end of the post and is contoured on its upper surface for engaging a blade 75 in the proper attitude for insertion into the fixture slots 73. Normally, the blades will be in this attitude between the lugs 131 on the chains 101 and 102 as said upper courses 114 and 115 pass under the assembling position 14.

A pair of guide members 156 and 157 (FIGURES 4 and 17) are adjustably mounted upon the left frame 104 on opposite sides of, and substantially parallel with, the upper courses 114 and 115 below the assembling position 14 for engaging the ends of the blades 75 and thereby guiding them into proper position for the transferring operation conducted by the transfer mechanism 133. The drive chain 126 is held under tension by the idler sprocket 158 (FIGURE 3), which is rotatably and adjustably mounted upon the left frame 104. A timing cam 159 (FIGURES 15 and 17) is supported upon the cam shaft 149 for engaging a timing switch 161 (FIGURE 5). A counting switch 162 (FIGURE 5) is mounted upon the lift plate 135 for operation by a cam 163 each time said lift plate 135 moves far enough away from the fixture 16 or 17, which is in assembling position, so that said fixture can rotate without interference from the posts 134.

(f) Welding apparatus

In this particular embodiment of the invention, the blades 75 are welded to the annular end members 77 and 78 of the blower wheel 79. However, it will be recognized that riveting, or other, similar methods of securing said blades to said annular end members, may be utilized without material, if any, modification of the basic elements or organization of the machine. The welding apparatus 21 (FIGURES 3, 6 and 7) is comprised of a welding head 23 adjustably supported upon a welding head support structure 22. As indicated in broken lines in FIGURES 2, 3 and 4, the welding apparatus 21 is arranged so that the welding head 23 is adjustably supported above the assembling position 14.

The welding head 23 includes a mounting frame 186, which is slidably supported by means of the substantially horizontal slide ways 187 upon the support structure 22 near the rightward end thereof. A relatively large adjustment screw 188 (FIGURES 6 and 7) is provided for adjusting the leftward and rightward movement of the mounting frame 186 in the slide ways 187, in a substantially conventional manner. The welding head 23 also includes a pivot frame 189, which is pivotally supported upon the mounting frame 186, for adjustable and pivotal movement about a substantially horizontal axis 191 perpendicular to the axis of the adjustment screw 188. An electrode reciprocating block 192 is slidably mounted upon the pivot frame 189 for movement in a direction perpendicular to said axis 191. Said block 192 is secured to the lower end of the piston 193 of a power cylinder 194 mounted upon said frame 189. Thus, actuation of the cylinder 194 effects a substantially vertical reciprocation of the block 192 along the pivot frame 189.

A pair of electrode support members 195 and 196 (FIGURES 8 and 9) are slidably supported upon the electrode reciprocating block 192 for movement in a horizontal direction substantially parallel with the pivot axis 191. Adjustment screws 197 and 198 are provided for effecting adjustment of the electrode support members 195 and 196 along said block 192 in said direction. The electrode support members 195 and 196, which are substantially mirror images of each other, each support a fixed electrode 199 and 200, respectively, and a movable electrode 202 and 203, respectively. Each movable electrode 202 and 203 is pivotally mounted upon its respective support member by means of a pivot shaft 204, and each of said movable electrodes is engaged by the piston 205 of a pressure cylinder 206 for pivoting said movable electrodes about their shafts 204 toward and away from said fixed electrodes. The fixed electrodes 199 and 200 embrace the remote surfaces, respectively, of the annular members 77 and 78 (FIGURE 9) and the movable electrodes 202 and 203 are pivoted into position adjacent to the opposing surfaces of said annular end members. A pair of control switches 207 (FIGURE 5) are provided with said movable electrodes 202 and 203 for operation thereby when said electrodes are fully retracted from engagement with said annular end members 77 and 78, for reasons appearing hereinafter.

By virtue of the various adjusting mechanisms associated with the welding head 23, it will be apparent that the welding electrodes may be adapted quickly and easily for use with a variety of sizes and shapes of blower wheels 79.

A control switch 208 (FIGURE 5) is provided for operation by the electrode reciprocating block 192, or a part movable therewith, when said block 192 is lowered out of its raised position. A suitable source of electrical potential, such as a transformer 209, is mounted upon the support structure 22 (FIGURE 6) and connected to the electrodes, in a substantially conventional manner, for effecting a weld of the blade ears 174 to the annular end members 77 and 78.

(g) Fixture discharge mechanism

The fixture discharge mechanism 19 (FIGURES 2 and 4) has a frame 211 supported upon the base frame 27 on the opposite side of the pedestal 26 from the left frame 104 of the conveyor support structure 103. The front end of the discharge frame 211 is disposed below the discharge position 18 of the fixtures 16 and 17. The discharge frame 211 rotatably supports a substantially horizontal, elongated discharge screw 212, which extends substantially from the front end to the rear end of the frame 211. A discharge head or slider 213 is slidably supported upon the frame 211 for movement lengthwise thereof by the screw 212 with which it is threadedly engaged. A suitable prime mover, such as an air motor 214, is mounted upon the frame 211 and connected to the screw 212 for rotating same, whereby the slider 213 is moved lengthwise of the frame 211. The slider 213 mounts an air-driven wrench 215 having a shaft 216 (FIGURE 10) releasably engageable, and co-axial, with the adjacent end of the nut shaft 69 supported in the movable half 62 of the fixture 16, which is disposed in said discharge position 18. Thus, actuation of the air wrench 215, operating through its shaft 216 and the nut shaft 69, will effect a disengagement of the nut 64 from the draw shaft 63 (FIGURE 10) thereby permitting release of the movable half 62 from the fixed half 61 of the fixture 16. Said slider 213 also has an integral sleeve 217, which slides over the hub 67 on the movable half 62, for supporting said movable half 62 as it is backed away from the fixed half 61 along the discharge frame 211 by the screw 212. For further detailed description of the construction of the slider 213 and its parts associated with the fixtures 16 and 17, reference is made to the above mentioned, co-pending application which relates primarily to the fixtures.

As stated hereinabove, the movable halves 62 and 62a of the fixtures 16 and 17, respectively, are provided with stripper rings 85, which are preferably substantially identical to each other. A stripping barrier 218 is adjustably and securely mounted upon the discharge frame 211 near the rear end thereof for engaging the stripping ring 85 on said movable half 62 or 62a as it approaches the rearward end of the frame 211 for actuating the stripping mechanism associated with said ring 85 and thereby discharging the blower wheel 79 from its position upon the movable half 62 or 62a. As shown in FIGURE 5a, the slider 213 is engageable with a pair of outer switches 219 and 220, located at the opposite ends of the discharge frame 211, and is also engageable with a pair of inner switches 222 and 223, located between said outer switches 219 and 220. The slider 213 moves, in this particular embodiment, at a faster speed between the inner switches 222 and 223 than it does between the corresponding inner and outer switches at the opposite ends of said frame 211.

(h) Control system

In general, the system by which the various operations of the machine 10 are initiated, controlled, coordinated, timed or sequenced and then terminated may be of a substantially conventional type utilizing any desired components, such as conventional electrical and/or pressure fluid apparatus. As indicated in FIGURE 26, the various functional parts of the machine are in this embodiment associated with an electrical sequencing system or network 224 which energizes the motors 129 and 164 and operates the clutches 128 and 165.

Figure 26:
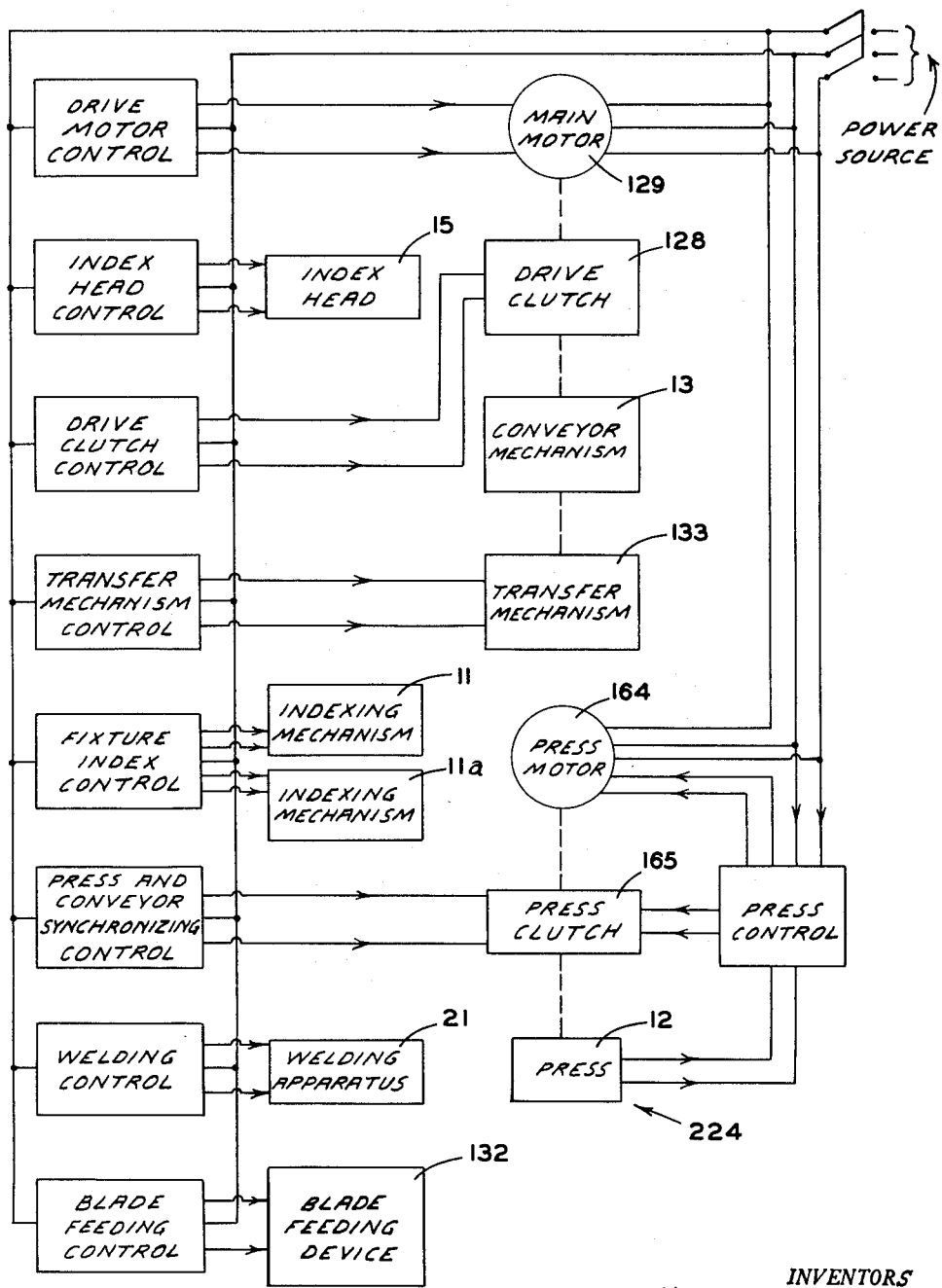
FIGURE 26 is a block diagram illustrating the control system of the machine.

The various controls of FIGURE 26 are electrically connected in a conventional manner to the several switches shown in FIGURE 5. For example, the clutch 165 is energized and then deenergized by the switches 183 and 184, respectively, whereby the press 12 is caused to produce a blade 75. Others of the connections between said switches and said controls produce electrical operation or actuation of valves which selectively control the flow of a pressure fluid to actuating cylinders or the like. For example, operation of the switch 49 (FIGURE 5) by the pawl 43 opens a valve, not shown, whereby pressure fluid is directed into the cylinder 58. This extends the piston rod 57 whereby the brake pin 53 is caused to engage the index gear 41.

The particular type of control, switch or connection utilized to effect the operation of the machine 10 forms no part of the invention. Thus, since the provision of a system to effect the proper operation of the machine 10 is merely a matter of design which can be accomplished by a skilled technician familar with this type of equipment, after he has observed the various parts to be operated and functions to be performed by the invention, further details regarding the control system are believed to be unnecessary.

(i) Modifications

It will be apparent that, although the press 12 is herein specifically disclosed as an integrated source of supply of formed blades 75, other types of sources of supply of blades may be utilized within the principal concepts of this invention. For example, the punch press 12 might be operated independently of the remainder of the machine 10 to provide a supply of blades 75, which are stored in a suitable magazine or container, such as that indicated at 231 in FIGURE 23. The magazine 231 is then disposed above the loading table 232 for depositing blades onto said table, which blades are moved by the loading bar 233 onto the conveyor 13. From the point of depositing the blades on said table, the remainder of the machine 10 is substantially identical to that disclosed hereinabove.

Figure 24:
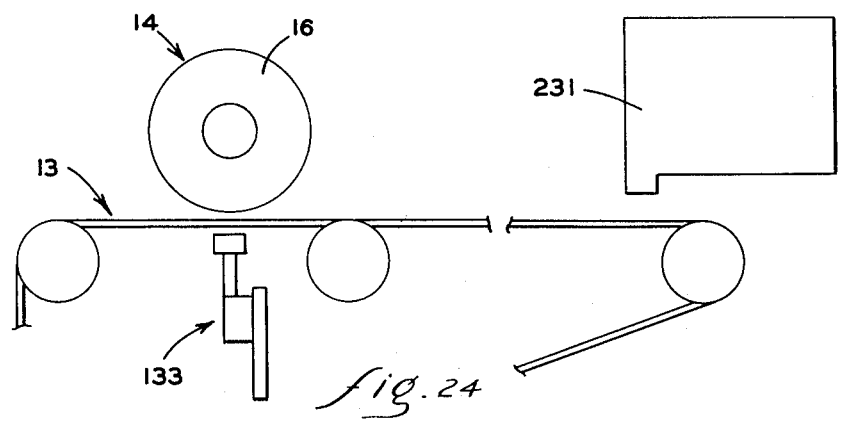

In another form of the machine, indicated in FIGURE 24, the magazine 231 is positioned to deposit the blades 75 directly onto the conveyor 13. In such case, the blades would either be properly positioned within the magazine or container 231, or said container would be provided with means for placing the blades 75 in a proper position upon said conveyor 13. As indiciated in FIGURE 25, it may also be advantageous, under some circumstances, to provide a magazine 236 adjacent to the transfer mechanism 133 and to replace the conveyor mechanism 13 and the loading mechanism 132 with a relatively short chute 238, or the like. In such case, the blades 75 would be deposited substantially directly from the magazine 236 onto the transfer mechanism 133 for insertion into the one of the fixtures 16 or 17 which at a given moment is disposed in the assembling position 14.

It will also be evident that the fixture discharge mechanism 19 can be replaced by a variety of various devices for engaging the movable half 62 of the fixture and moving it and the finished blower wheel 79 away from the fixed half 61 of said fixture.

OPERATION

(a) In general

The operation of the particular embodiment of the invention disclosed herein, which is best illustrated by FIGURES 1, 2, 4, 5 and 5a, is fully automatic from the time the machine operator starts a fixture on its way from the discharge position 18 toward the assembling position 14 by operating a switch, until the blower wheel 79 is fully assembled and fabricated upon said fixture in the assembling position, providing a roll of material 167 is properly fed into position between the dies 172 and 173 of the press 12. At the end of this cycle, the operator must then, in the present embodiment, operate said switch for rotating the indexing head 15 and thereby reversing the positions of the fixtures 16 and 17 to initiate another cycle of operation of said machine. The fixture discharge mechanism 19 is separately controlled by the operator for discharging the finished blower wheel 79 from the particular fixture disposed in the discharge position 18.

During each cycle of operation of the machine 10, a blower wheel 79 is completely assembled upon a fixture, such as fixture 17, disposed in the assembling position 14. During a cycle of operation, the fixture disposed in the assembly position 14 is indexed or rotated intermittently in uniform increments about its horizontal axis a number of times corresponding to the number of blades in the blower wheel being assembled, plus an additional number of increments, usually four or five. These additional increments represent the number of indexes of said fixture required between the time the first blade is inserted into the fixture and the first blade (which usually is that same blade) is welded to the annular end members. During the rotation of the fixture in the assembly position through a complete cycle of said indexing movements, the machine performs a sequence of operations, some of which are repeated with each index or movement of the fixture in the assembly position and some of which occur just once during the entire cycle. Those operations performed by the machine which are conducted once during the cycle will be considered first.

(b) *Preparation for operation*

An operating cycle commences with the fixture in the loading and discharge position 18 adjacent to the front end of the fixture discharge mechanism 19. However, before commencing the automatic portion of a cycle of operation, the fixture in the discharge position 18 must first be loaded with a pair of annular end members to which the blades 75 will eventually be secured. In this particular embodiment, the fixtures 16 and 17 are of the type utilized to fabricate and assemble a double blower wheel. In other words, the finished wheel not only has a pair of annular end rings, but also has a central structure between said end rings. Thus, in loading the fixture in the loading or discharge position, an end member 77 is placed on the reduced portion 76 of the flange 71 and forced over the detent pins 81 and against the large portion 83 of said flange 71. The central structure 82 is then sleeved upon the draw shaft 63 until it engages the outer end of the fixed half 61. Said central structure 82 is provided with suitable openings near its periphery, through which the alignment pins 65 may extend for properly aligning and positioning said central structure 82.

The movable half 62 of the fixture, which is supported upon and engaged by the sleeve 217 of the discharge head or slider 213, is spaced from the fixed half 61 because the head 213 is presently at the rearward end of the discharge mechanism frame 211. Thus, the end member 78, which is usually identical to the end member 77, is mounted upon the movable half 62 against the large portion 83 of the flange 72. With the end members 77 and 78 and the central structure 82 thus in position upon the fixture halves 61 and 62, the operator then energizes the air motor 214, which causes the discharge screw 212 to be rotated at a relatively slow speed, thereby urging the head 213 forwardly. When the head 213 (FIGURE 5a) passes the inner switch 223, said switch 223 is operated, thereby increasing the rotational speed of the screw 212, hence increasing the traverse speed of the head 213 toward the front end of the frame 211. As the head 213 passes the inner switch 222, said switch is operated, thereby slowing down the rotation of the screw 212, hence the traverse speed of the head 213. As about the time the draw shaft 63 engages the nut 64, the head 213 engages the outer switch 219, thereby stopping, or cutting off, the power to the air motor 214. The operator now actuates the air wrench 215, whereby the nut 64 is threaded onto the draw shaft 63 until the movable half 62 is snugly secured to the fixed half 61, with the end members 77 and 78 and the central structure 82 in proper position, the alignment pins 65 having been properly inserted into the alignment openings 66. The operator now energizes the motor 214 in the reverse direction, thereby backing the discharge head 213 away from the fixture in said discharge position 18. The two inner switches 222 and 223 will be actuated first to increase and then to decrease the traverse speed of the head 213 in its rearward movement, after which the outer switch 220, when engaged by the head 213, will automatically deenergize the motor 214. The head 213 will remain in this rearward position until the end of the automatic portion of the cycle of operation of the machine 10, which is now about to begin.

Before describing the automatic portion of the cycle of operation, consideration will be given to the condition of the machine as such portion begins. The indexing head 15 is disposed so that one fixture is in the assembling position 14 and the other fixture is in the discharge position 18, the fixture in assembly position being empty and the fixture in the discharge position 18 carrying a pair of annular end members and a central structure, as just described in the preceding paragraph.

The head detent pin 24 will be held by the head detent cylinder 25 in its raised position, hence in engagement with the indexing head frame 37, thereby preventing any rotation of the head 15. Thus, the upper detent switch 20 will be operated by suitable means on the connector bar 25a and operable with the detent pin 24 (FIGURE 5a). The limit arm 36 on the drive shaft 28 will be disposed in operating position against either the limit switch 39 or the limit switch 40, depending upon the rotational position of the indexing head 15.

The electrical system of the machine, hence the motors 129 and 164 (FIGURE 5), is preferably energized prior to the loading of the fixture in the discharge position. The electric clutch 128 will be deenergized, thereby disconnecting the motor 129 from the gear box 127. Hence, the conveyor mechanism 13 will be non-operative. The lift plate 135 will be in its lowest position so that the lift posts 134 are spaced downwardly from the fixture in the assembling position 14. The portion of the welding head 23 supported upon the electrode reciprocating block 192 will be in the raised position by virtue of the retraction of the power cylinder 194 mounted upon the pivot frame 189. The welding head 23 will have been adjusted previously. The pawl 43 will be in engagement with the teeth on the periphery of the index gear 41 and the index cylinder 45 will be in its retracted position. The brake pin 53 will be in detent position between a pair of adjacent teeth on the gear 41. The blade loading bar 169 (FIGURE 13) on the blade table 168 will be rightwardly of the blade chute 166 by virtue of the retraction of the power cylinder 181, which operates said blade loading bar 169. The motor clutch 165 will be deenergized with the press upper die 172 in the raised position.

(c) *Automatic operation*

The automatic operation of the machine 10 is initiated by a switch which first actuates the detent cylinder 25 (FIGURE 21), thereby disengaging the detent pin 24 from the indexing head frame 37. When the piston of the detent cylinder 25 reaches the bottom of its stroke, the detent pin 24 is clear of the indexing head frame 37 and the lower detent switch 30 is operated, thereby energizing the head rack cylinder 32. If, as here, the cylinder 32 is in its retracted position as the cycle begins, energization of said cylinder 32 will effect an extension of its piston. This will cause the rack 31 to rotate the indexing head 15 about 180° clockwise, as appearing in FIGURE 2. As the rack cylinder 32 approaches its fully extended position, the rack cam 33 on the rack 31 (FIGURE 18) will engage and operate the outer rack switch 34, thereby deenergizing the cylinder 32. The momentum of the indexing head 15 will cause it to move until the limit arm 36 engages the limit switch 40, which energizes the detent cylinder 25, thereby raising the detent pin 24 to reengage the indexing head frame 37 and lock it in its new position. As the detent pin 24 becomes fully seated against the indexing head frame 37, the upper detent switch 20 will be operated, whereby the electric clutch 128 will be energized to connect the gear box 127 with the motor 129 and the clutch 165 with the press motor 164. The indexing head 15, the detent pin 24 and the rack 31 will remain in the positions just set forth throughout the remainder of the cycle of operation being described.

Engagement of the clutch 128 causes the gear box 127 to rotate the cam shaft 149 and drive shaft 124 through the chain 126. The drive shaft, operating through the Geneva wheel assembly 122, effects intermittent, unidirectional movement of the conveyor chains 101 and 102 in a counterclockwise direction, as appearing in FIGURES 5 and 15. Rotation of the cam shaft 149, operating through the cam 148 and the actuating lever 144, effects a vertical reciprocation of the lift plate 135 and lift posts 134 which is timed with the intermittent, unidirectional movement of the conveyor chains 101 and 102.

In preparing the machine 10 for operation, blades 75 are placed in proper position, upon the upper courses 114 and 115 of the chains 101 and 102, so that blades will be immediately available for insertion by the transfer mechanism 133 into the fixture in assembly position 14. This may be accomplished manually and is necessary only before the first cycle of operation, or until the blades being currently formed by the punch press reach the assembling position. Where the course of supply of formed blades is placed directly adjacent to the assembling position (FIGURE 25), such pre-arranging of blades becomes unnecessary.

The operation of the upper detent switch 20 (FIGURE 21) by means on the connector bar 25a will energize the press clutch 165 at the same time that it energizes the drive clutch 128. Thus, the punch press 12 will begin to operate at the same time that the conveyor mechanism 13 and the transfer mechanism 133 begin their operation. Assuming for the moment that a constant supply of blades is being fed to the assembling position by the conveyor mechanism 13, attention will be directed to the operation of the various parts associated with the assembling of the blower wheel 79 at the assembling position 14.

(d) Blade transfer

The first action to occur will be a movement of the conveyor to bring a blade into position over the lift station. When this is completed, the lift plate 135 (FIGURES 15 and 17) is moved upwardly by the actuating lever 144, so that the lift platform 152 on the lift posts 134 will engage the blade 75 disposed upon the conveyor chains directly below the assembling position 14 and drive said blade upwardly into the fixture 16 or 17 disposed in said assembling position. The respective ends of said blade will be received into the slots 73 in the flanges 71 and 72 and held there by the springs 74 associated with each slot. The ears 174 on the blades 75 will be disposed adjacent to the opposed surfaces of the annular end members 77 and 78 and the center portions of the blades 75, which may be notched, will engage the periphery of the central structure 82 at such notches. At this point, the conveyor chains 101 and 102 will be at a standstill because of the particular disposition of the driver 123 of the Geneva wheel assembly 122. As the lift plate 135 moves downwardly, the Geneva driver 123 will engage the driven member 121 and effects the next movement of the conveyor chains.

As said lift plate 135 (FIGURES 5 and 15) moves downwardly, the switch 162 will be operated, thereby indicating to the electrical sequencing system of the machine that the lift posts 134 are clear of the fixture in the assembling position. As soon as this signal is received from the switch 162, the brake pin 53 will be removed from engagement with the teeth of the drive gear 41 by the detent cylinder 58, after which the index cylinder 45 will be energized, thereby extending its piston 44 and causing the pawl 43 to rotate the drive gear 41. Although the extent and character of such rotation may be varied substantially, said rotation will normally be limited to angular increments which are whole number multiples of the angular distance between a pair of adjacent slots 73. Where, as here, the blades are welded to the rims, said increments are preferably of sufficient length to avoid concentrations of heat in said rims and thereby minimize warping. These multiple increments, that is angular increments which are greater than said angular distance between a pair of adjacent slots 73, are advantageously uniform in order to avoid complications in the mechanism which indexes the fixture about its axis.

If such a multiple increment is used, it must not be an even division of the number of blades in the desired wheel, or the wheel cannot be completed. For example, a 40, 45 or 50 blade wheel cannot be assembled and/or welded where the fixture is uniformly rotated the angular distance between every fifth blade. However, where adjacent blades can be secured to the rims without any ill effects upon the finished product, the fixtures may be rotated or indexed from one slot to the next. In this particular embodiment the increment of rotation is equal to the angular distance between every fifth slot 73 in said fixtures, or 37.5° for a 48 blade blower wheel.

At the end of a drive stroke of the pawl 43 (FIGURE 20), the switch operator 51 on the pivot arm 42 will operate the switch 49, thereby causing the detent cylinder 58 (FIGURE 19) to move the brake pin 53 into detent position against the drive gear 41. Thus, the fixture 16, which rotates with said drive gear 41, has now been rotated or indexed to the next position for blade insertion by the transfer mechanism 133, and will be held in such position by the brake pin 53.

Simultaneously with the above operations, which inserted a blade into the fixture and indexed the fixture to the next position, the press 12 (FIGURES 1 and 5) will operate to produce one blade which will move down the blade chute 166 onto the blade table 168, from which it will be deposited upon the upper courses of the conveyor chains by the blade loading bar 169. With each downward movement of the upper movable die 172, a counting switch 185 may, if desired, be operated, thereby actuating a counter mechanism. If such switch is used, when it has been operated as many times as there are blades in the particular blower wheel 79 being assembled, electrical counting mechanism of a conventional type associated with the press 12 and the switch 185 may act to deenergize the press clutch 165 until a new cycle of operation is initiated.

(e) Welding

In this particular embodiment, the fixture in the assembling position 14 will be indexed or moved four times before the welding apparatus (FIGURES 6, 8 and 9) will start to operate. This provides the rotation necessary to move the first blade inserted into the fixture into position where it can be engaged and welded by said welding head 23. However, at some time before the fourth indexing of the fixture occurs, the power cylinder 194 is energized to move the reciprocating block 192 downwardly until the fixed electrodes 199 and 200 are disposed on opposite, remote sides of rims 77 and 78 on the fixture in said assembling position. The movable electrodes 202 and 203 will remain in their raised position, indicated in broken lines at 203a in FIGURE 9, until the indexing of the fixture from one blade receiving position to the next is completed and a blade is properly positioned for welding. As the block 192 is moved downwardly, the control switch 208 is opened, thereby deenergizing that part of the circuit 224 operating the detent cylinder 25. As soon as the micro-switch 49 signals that the brake pin 53 is being placed in detent position, the power cylinder 206 associated with each of said movable electrodes 202 and 203 is energized, thereby pivoting the movable electrodes 202 and 203 into welding position (FIGURE 9) against the ears 174 at the opposite ends of the blade 75 being welded. The electrodes are then energized from the transformer 209 in a conventional manner to effect a weld between said blades and said end members or rims.

After the electrodes have been denergized, also in a conventional manner, the movable electrodes are retracted from their welding positions by the power cylinders 206 and the welding operation is complete. A pair of control switches 207, which are operable, respectively, by said movable electrodes 202 and 203 as they move into retracted position, must be so operated to permit energization of the drive clutch 128. The indexing of the fixture and movement of the welding head 23 is timed by an electrical counting or sequencing system 224 (FIGURE 26) which may be of any well-known type and, therefore is shown diagrammatically. Such counting apparatus may be actuated from any convenient point on the machine, such as the cam 159 on the shaft 149, or by the switch 162, as desired. If the welding operation is not complete when it becomes time for the electrical sequencing system 224 to energize the index cylinder 45 for indexing the fixture to its next position, nothing will happen because the switches 207, which are in such system, will not be closed. In the event that a welding operation requires more than the time scheduled for this operation, the timing cam 159 on the cam shaft 149, operating through the timing switch 161, will delay the occurrence of all of the subsequent operations of the entire machine to compensate for this delay caused by the welding operation.

In a similar manner, the synchronizing cam 182 (FIGURE 5) on the sprocket shaft 110, operating through the synchronizing switches 183 and 184, will disengage the press clutch 165 and synchronize the press 12 with the remainder of the machine. The operation of the power cylinder 181, which operates the loading bar 169, is also controlled by the operation of the switches 183 and 184. The photoelectric cell 99 may be connected to a buzzer, or other signaling means of a conventional type, for announcing a missing or improperly positioned blade 75 along the conveyor chains 101 and 102. The operator can then arrange a blade in the appropriate position without stopping the machine. The switch 162 acts as a signaling device to said counting system of the machine, whereby the electric clutch 128 is deenergized when the proper number of blades has been inserted into the fixture in the assembling position. However, such deenergization of the drive clutch 128 will have no effect upon the welding apparatus 21, which must continue to operate for four more welding operations because of the fact that it did not begin to operate until the fixture had been indexed four times. Thus, the index cylinder 45 will continue to be energized in its normal periodic sequence until the last blade in the fixture is welded into position.

When the switches 207 signal said electrical sequencing system 224 that the last blade has been welded, the cylinder 194 is again actuated, thereby raising the reciprocable block 192 with the welding electrodes mounted thereon. This will operate the switch 208 whereby the circuit operating the head detent cylinder 25 is energized. The machine will now remain in this position, that is, with the welding head 23 spaced from the fixture in the assembling position, with the brake pin 53 in detent position, with the drive clutch 128 and the press clutch 165 deenergized, and with the transfer mechanism 133 in its lowered position, until the operator is ready to start another cycle of operation of the machine. This arrangement prevents accidental pivoting of the head 15 before the fixture in the discharge position 18 is properly made ready for movement into the assembling position 14.

When the operator is ready to pivot the indexing head and thereby commence the automatic portion of a new cycle of operation of the machine, he simply operates a switch, which causes the indexing head to move through an arc of about 180° about a vertical axis, as described hereinabove. Since the first movement of the indexing head, above described, was in a clockwise direction, as appearing in FIGURE 2, the second movement of the head will occur in a counterclockwise direction due to the arrangement of the rack 31 and cylinder 32. However, before the operator effects a rotation of the head 15, the fixture in the discharge position 18 must have end members and a center disk mounted thereon as described hereinabove. This can, and usually will be, accomplished while the fixture in assembling position is being indexed. Thus, the operator will normally cause the index head to rotate as soon as the indexing of the fixture in assembling position is completed. As in the first cycle described, such rotation of the head 15 must be preceded by a disengagement of the detent pin 24 from the head frame 37.

The above described cycling of the machine may be continued as long as desired or required.

Figure 23:
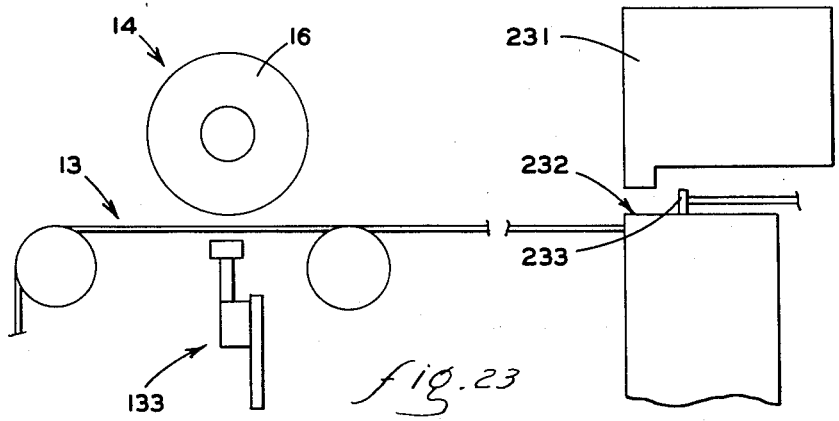
FIGURES 23, 24 and 25 are diagrammatic views of modifications in the conveyor mechanism of the same machine.
Figure 25:
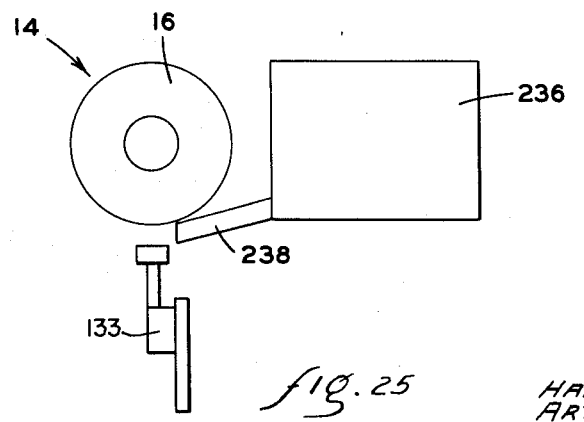

It will be seen, by reference to FIGURES 23, 24 and 25, that certain modifications may be made in the detailed structure of the machine without departing from the basic concepts of the invention. For example, and as indicated in FIGURE 23, the punch press may be operated entirely independently of the remainder of the machine 10, thereby permitting operation of said press at a higher speed. The blades formed by the press are then placed in a magazine or other container 231 for use with the machine 10. The container 231 may be provided with means for depositing the blades directly upon the conveyor 13, or as shown in FIGURE 25, the container 236 may discharge its blades directly onto the transfer mechanism 133. It will be observed, however, that in every instance the basic combination of a device for automatically assembling the blades with respect to the annular end members and then securing the blades to said end members persists in all of the various forms of the invention disclosed herein.

Although particular, preferred embodiments of the invention have been disclosed hereinabove for illustrative purposes, it will be understood that variations or modifications thereof, which lie within the scope of the invention, are fully contemplated unless specifically stated to the contrary in the appended claims.

What is claimed is:

1. A machine for assembling a centrifugal blower wheel having a pair of spaced, circular and coaxial members secured to the opposite ends of a plurality of blades, comprising: a fixture supporting a pair of said coaxial members in the spaced position that said coaxial members occupy after assembly, said fixture and said coaxial members being conjointly rotatable about their common axis, said fixture having a plurality of peripherally spaced blade-gripping members secured thereabout so that blades brought to the appropriate blade-gripping members will be grasped thereby and held in substantially abutting contact with and at the proper place with respect to said coaxial members; an indexing device associated and interconnected with said fixture to rotate the latter and said coaxial members about said common axis to effect intermittent and timed indexing of said coaxial members so that said blades may be positioned on and assembled to said coaxial members at selected and spaced, peripheral intervals thereabout; drive means to operate said indexing device; a shaft, the shaft axis of which is at substantially a right angle to said common axis, said fixture being interconnected with and rotatable about said shaft axis; drive means to rotate said shaft and, conjointly therewith, to cause said fixture to be oriented selectively in an assembly position and in a loading and discharge position; a blade conveyor mechanism to hold blades in parallel, spaced positions and to intermittently advance said blades so that the same are at hand in said assembly position to be brought to said spaced peripheral intervals about said coaxial members; a blade transfer mechanism to intermittently transfer blades at said assembly position from said conveyor mechanism to said spaced peripheral intervals about said coaxial members, said blades being then held by said blade-gripping members as aforesaid; blade-securing mechanism coacting with said fixture to affix said blades in position about said coaxial members, at least some of said blades being affixed before the advancing and transferring of other of said blades are completed; means to drive said conveyor mechanism and said blade transfer mechanism; fixture opening and closing mechanism to open said fixture at said loading and discharge position, to release the assembled blower wheel therefrom and to assist the closing of said fixture to hold fresh said coaxial members in position for a repeat assembling cycle of a said blower wheel; means correlating said drive means for sequential operation whereby said blower wheel is assembled automatically and substantially untouched manually from the instant after said fixture is closed at said loading and discharge position to the instant that an assembled blower wheel is returned to the latter position.

2. The structure of claim 1 wherein the blade conveyor comprises a pair of endless conveyor elements and a plurality of pulleys supporting said elements for movement along uniformly spaced paths, said paths passing through said assembly position, said conveyor elements having blade-engaging members and the blade-engaging members on one conveyor element being transversely and uniformly aligned with the blade-engaging members on the other conveyor element, whereby a plurality of blades are moved sequentially into the assembly position for engagement by said blade transfer mechanism.

3. The structure of claim 1 wherein said blade transfer mechanism includes a base structure below said assembly position, a slide member vertically slidably supported upon said base structure for movement toward and away from said assembly position, a pair of blade-engaging members mounted upon said slide member and extending upwardly therefrom for engaging a blade on said conveyor mechanism at hand in said assembly position and moving said blade into engagement with said gripping members, and linkage interconnected between said slide member and said conveyor mechanism for effecting vertical reciprocation of said slide member in coordination with the advancement of said blades into said assembly position.

4. The structure of claim 1 wherein said blade-securing mechanism includes a welding head and structure supporting said head near said assembly position, said head including a pair of first electrodes of the same polarity and mechanism supporting said first electrodes for movement into and out of positions respectively adjacent to said coaxial members, a second pair of electrodes of polarity opposite to the polarity of said first electrodes, said second electrodes being pivotally supported with respect to said first electrodes for movement into and out of engagement respectively with said coaxial members, and actuating means for effecting the pivotal movement of said second electrodes and said movement of said first electrodes in coordination with the advancement of said blades into said assembly position.

5. The structure of claim 1 wherein a plurality of fixtures is supported upon said shaft for simultaneous rotation around said shaft axis, the said common axis of each fixture lying substantially within a single plane perpendicular to said shaft axis, one of said fixtures being located in said assembly position when another of said fixtures is located in said loading and discharge position, and wherein said drive means to rotate said shaft comprises an actuator and an index mechanism connected between said shaft and said fixtures for moving one of said fixtures sequentially into and out of said assembly position at the same time the other of said fixtures is similarly moved into and out of said loading and discharge position.

6. The structure of claim 1 wherein said fixture has first and second coaxial and separable parts, said first part being mounted upon said shaft and rotatable around an axis perpendicular to said shaft axis, clamping mechanism supported upon said second part and engageable with said first part, and wherein said opening and closing mechanism comprises an actuating mechanism adjacent said loading and discharge position engageable with said clamping mechanism for operating same and supporting said second part when the same is disengaged from said first part, said actuating mechanism being movable toward and away from said shaft axis for effecting separation of the second part of the fixture from the first part thereof; drive means to operate said actuating mechanism.

7. The structure of claim 1 wherein said indexing device includes an indexing head frame rotatably supported upon said shaft, a fixture shaft secured to said fixture and rotatably supported upon said indexing head frame, a ratchet wheel secured to and rotatable with said fixture shaft, an arm supported for pivotal movement around the axis of said fixture shaft adjacent said ratchet wheel, a pawl pivotally supported upon said arm and engageable with said ratchet wheel, an actuator supported upon said indexing head frame and connected to said arm for effecting oscillating pivotal movement of said arm, and electrical controls interconnected between said conveyor mechanism and said actuator for effecting intermittent operation thereof in coordination with the movement of said conveyor mechanism, whereby said pawl effects rotation of said ratchet wheel and said fixture in selected circumferential increments.

8. A machine for assembling a centrifugal blower wheel having a pair of spaced, circular and coaxial members secured to the opposite ends of a plurality of blades, comprising: a fixture having holding mechanism for positioning a pair of the coaxial members in the spaced position that said coaxial members occupy after assembly, said fixture and said coaxial members being conjointly rotatable about their common axis, said fixture having a plurality of peripherally spaced blade-gripping members secured thereabout so that blades brought to the appropriate blade-gripping members will be held thereby in substantially abutting contact with and at the proper place with respect to said coaxial members; an indexing device associated and interconnected with said fixture to rotate the latter and said coaxial members about said common axis to effect intermittent and timed indexing of said coaxial members so that said blades may be positioned on and assembled to said coaxial members at selected and spaced, peripheral intervals thereabout; drive means to operate said indexing device; a shaft, the shaft axis of which is at substantially a right angle to said common axis, said fixture being interconnected with and rotatable about said shaft axis, drive means to rotate said shaft and, conjointly therewith, to cause said fixture to be oriented selectively in an assembly position and in a loading and discharge position; a blade conveyor mechanism to hold blades in parallel positions and to advance intermittently said blades so that the same are at hand in said assembly position to be brought to said spaced peripheral intervals about said coaxial members; a blade transfer mechanism to transfer intermittently blades at said assembly position from said conveyor mechanism to said spaced peripheral intervals about said coaxial members, said blades being then held by said blade-gripping members as aforesaid; blade-securing mechanism coacting with said fixture to affix said blades in position about said coaxial members, at least some of said blades being affixed before the advancing and transferring of others of said blades are completed; means to drive said conveyor mechanism and said blade transfer mechanism; actuating mechanism operatively connected with said holding mechanism to release the assembled blower wheel therefrom at said loading and discharge position and to engage fresh said coaxial members in position for a repeat assembling cycle of a said blower wheel; means correlating said drive means for sequential operation; whereby said blower wheel is assembled automatically and substantially untouched manually from the instant after said coaxial members are engaged at said loading and discharge position to the instant that an assembled blower wheel is returned to the latter position.

9. The structure of claim 8 wherein said blade conveyor mechanism includes a receptacle for holding a plurality of said blades in parallel positions, said receptacle being near said assembly position, a chute extending from said receptacle into said assembly position for advancing said blades to said assembly position sequentially for engagement one at a time by said blade transfer mechanism.

References Cited in the file of this patent

UNITED STATES PATENTS

| | | |
|---|---|---|
| 1,435,979 | Reed | Nov. 21, 1922 |
| 1,466,312 | Morcom | Aug. 28, 1923 |
| 1,766,573 | Westin | June 24, 1930 |
| 1,845,203 | Sibley | Feb. 16, 1932 |
| 2,143,462 | Allard | Jan. 10, 1939 |
| 2,143,463 | Allard | Jan. 10, 1939 |
| 2,155,264 | Freed | Apr. 18, 1939 |
| 2,174,801 | Meyer | Oct. 3, 1939 |
| 2,356,537 | Sandberg | Aug. 22, 1944 |
| 2,438,867 | Rockwell | Mar. 30, 1948 |
| 2,614,679 | Sandberg | Oct. 21, 1952 |
| 2,616,323 | Leifer | Nov. 4, 1952 |
| 2,620,420 | Abbott | Dec. 2, 1952 |
| 2,627,770 | Hautau et al. | Feb. 10, 1953 |
| 2,651,830 | Wilken et al. | Sept. 15, 1953 |
| 2,651,837 | Wilken et al. | Sept. 15, 1953 |
| 2,674,033 | Bojewicz | Apr. 6, 1954 |
| 2,757,438 | Smith | Aug. 7, 1956 |

UNITED STATES PATENT OFFICE
CERTIFICATE OF CORRECTION

Patent No. 2,996,788                      August 22, 1961

Harold A. Austin et al.

It is hereby certified that error appears in the above numbered patent requiring correction and that the said Letters Patent should read as corrected below.

Column 6, line 64, for "Wheel" read -- Wheels --; column 13, line 6, for "14," read -- 14. --; line 67, for "As" read -- At --; column 16, line 69, strike out "is", first occurrence; column 20, lines 8 and 9, before "engageable" insert -- releasably --.

Signed and sealed this 6th day of February 1962.

(SEAL)
Attest:

ERNEST W. SWIDER
Attesting Officer

DAVID L. LADD
Commissioner of Patents